(12) United States Patent
Sato et al.

(10) Patent No.: US 6,259,694 B1
(45) Date of Patent: Jul. 10, 2001

(54) SIGNAL PROCESSING CIRCUIT

(75) Inventors: Sadaharu Sato, Tokyo; Takayasu Muto, Kanagawa; Tetsuya Aoki, Tokyo, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/049,877

(22) Filed: Mar. 27, 1998

(30) Foreign Application Priority Data

| Apr. 1, 1997 | (JP) | 9-083137 |
| Apr. 1, 1997 | (JP) | 9-083162 |
| Apr. 2, 1997 | (JP) | 9-084136 |
| Apr. 2, 1997 | (JP) | 9-084137 |
| Apr. 2, 1997 | (JP) | 9-084192 |

(51) Int. Cl.[7] ................................. H04J 3/06
(52) U.S. Cl. ........................... 370/389; 348/425.1
(58) Field of Search .................. 370/389, 428, 370/503, 521, 517; 348/423.1, 474, 500, 425.1

(56) References Cited

U.S. PATENT DOCUMENTS

| 5,845,043 | * | 12/1998 | Yanagihara | 386/109 |
| 5,901,149 | * | 5/1999 | Itakura et al. | 370/468 |
| 5,966,385 | * | 10/1999 | Fujii et al. | 370/465 |
| 5,973,758 | * | 10/1999 | Soroushian et al. | 348/845.2 |
| 6,026,506 | * | 2/2000 | Anderson et al. | 714/746 |
| 6,069,902 | * | 5/2000 | Kurano et al. | 370/535 |
| B1 6,172,989 | * | 1/2001 | Yanaghihara et al. | 370/473 |
| B1 6,188,703 | * | 2/2001 | Dobson et al. | 370/537 |

* cited by examiner

Primary Examiner—Douglas Olms
Assistant Examiner—Ken Vanderpuye
(74) Attorney, Agent, or Firm—Frommer Lawrence & Haug, LLP.; William S. Frommer; Glenn F. Savit

(57) ABSTRACT

A signal processing circuit which enables an error bit to be set simply without causing an increase in the size of the circuit even if the packet size is changed and which enables realization of stable operation without the system stopping even if the value of the time stamp is impossible. A pre-reception processing circuit decides if a received packet is normally continuous or discontinuous from data in the DBC region of the CIP header. When deciding it is discontinuous, it sets an error bit ERM allocated to one bit of the upper significant 7 bits of the source packet header to "1", and writes this in an FIFO. A post-reception processing circuit, when reading from the FIFO, outputs the data stored in the FIFO to the application side when the error bit ERM is "0" and resets the error bit and outputs a dummy error packet when the error bit EMR is "1".

4 Claims, 15 Drawing Sheets

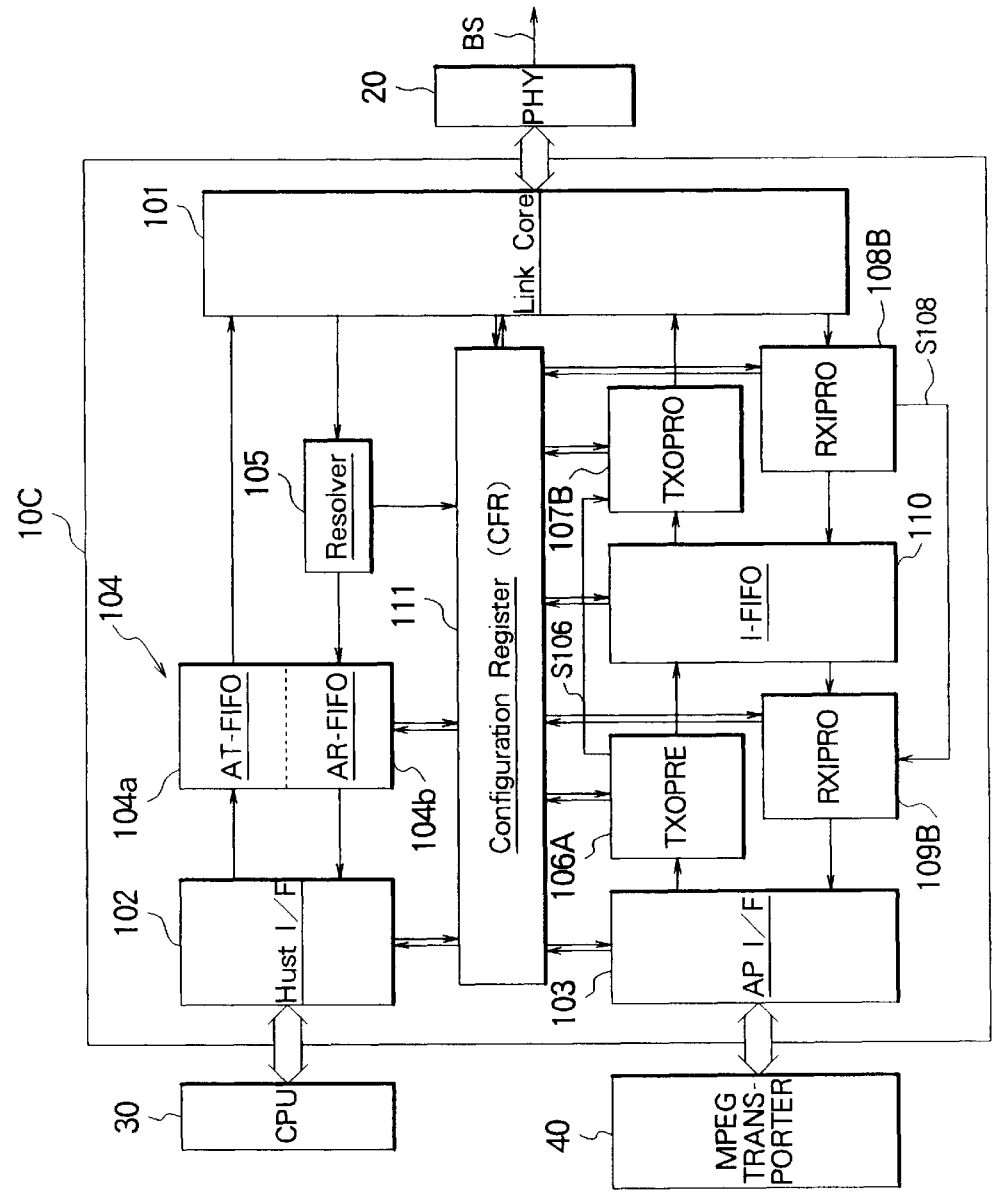

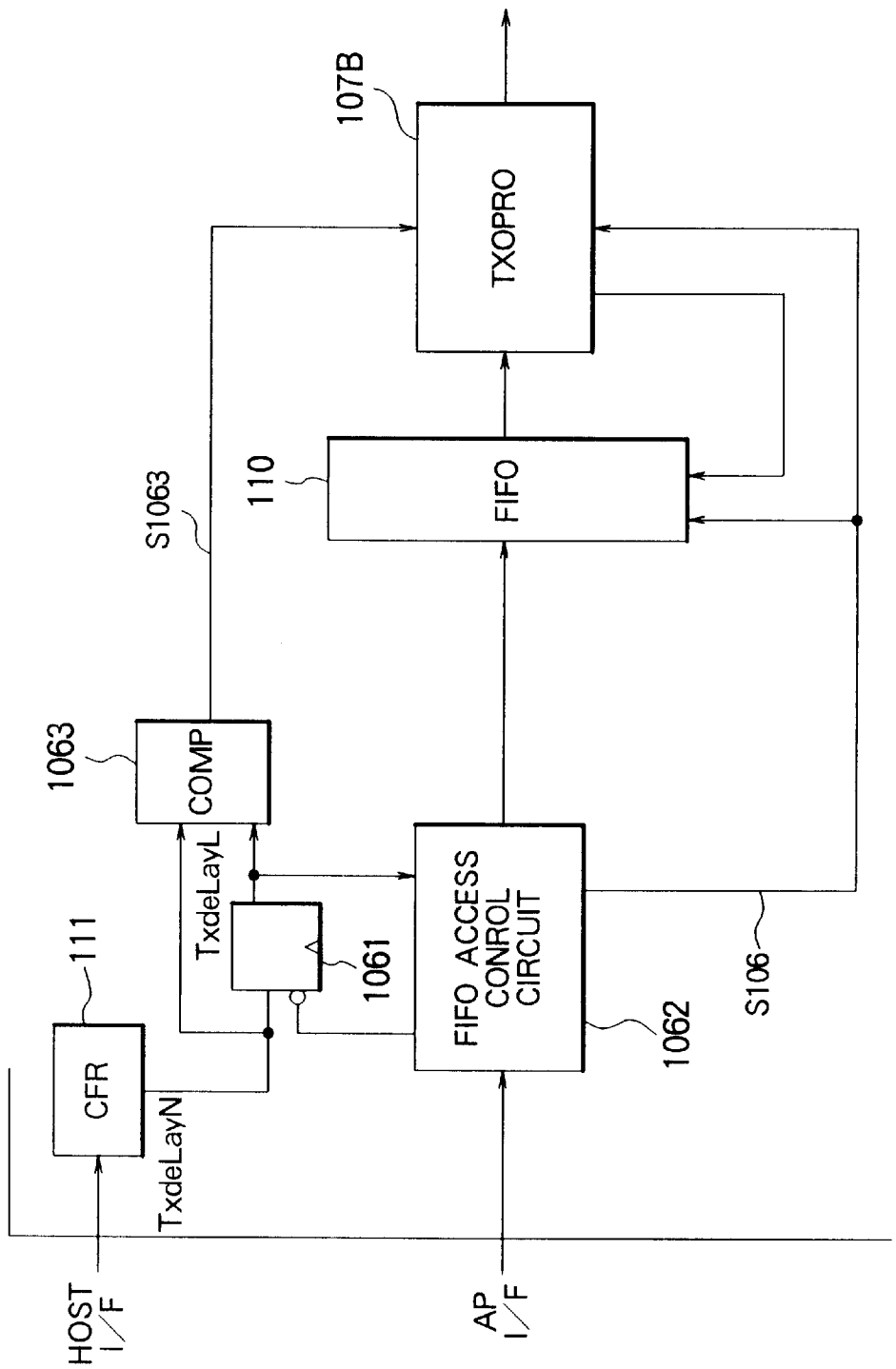

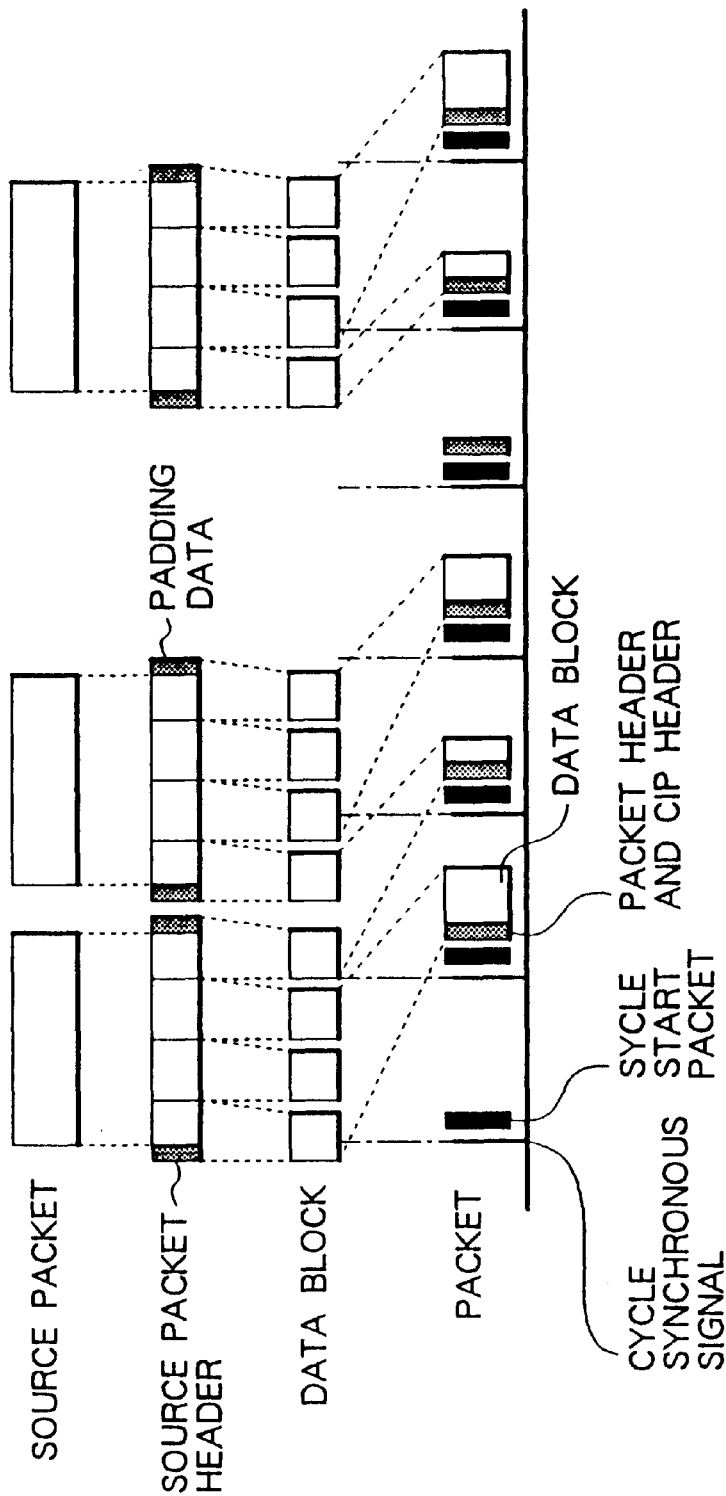

SOURCE PACKET HEADER (SPH)

SIGNAL PROCESSING CIRCUIT

BACKGROUND OF THE INVENTION

1. Field of the Invention

The present invention relates to a signal processing circuit used in a digital serial interface.

2. Description of the Related Art

In recent years, as an interface for transfer of multimedia data, the IEEE (Institute of Electrical and Electronic Engineers) 1394, High Performance Serial Bus for realizing high speed data transfer and real time transfer has become the standard.

The types of data transfer of this IEEE 1394 serial interface include asynchronous transfer for requests, requests for acknowledgement, and confirmation of reception of the related art and isochronous transfer with which the data is sent at one time from a certain node at 125 µs.

In this way, with an IEEE 1394 serial interface having such two transfer modes, data is transferred in units of packets.

FIGS. 11A and 11B are views of the byte size of a source packet in isochronous communication. FIG. 11A shows the size of a packet in the digital video broadcast (DVB) method; while FIG. 11B shows the size of a packet in the digital satellite system (DSS) method.

The source packet in the DVB method is comprised of 192 bytes, that is, 4 bytes of a source packet header (SPH) and 188 bytes of inherent transport stream data (TSD), as shown in FIG. 11A.

Contrary to this, the source packet in the DSS method is comprised of 144 bytes, that is, 4 bytes of a source packet header (SPH), 10 bytes of additional data (AD0 to AD9), and 130 bytes of inherent transport stream data (TSD) as shown in FIG. 11B.

The additional data is inserted between the source packet header and the transport stream data. Note that, in the IEEE 1394 standard, the unit of minimum data that can to be handled is one quadlet (=4 bytes=32 bits), therefore the transport stream data and the additional data must be set to be able to be comprised in total of 32 bit units.

Note that at the default, no additional byte is set.

FIG. 12 is a view of an example of a correspondence between the original data when data is transmitted in the isochronous communication of the IEEE 1394 standard and the packets actually transmitted.

As shown in FIG. 12, each of the source packets of the original data is given a source packet header of 4 bytes and padding data for adjusting the data length and then is divided into a predetermined number of data blocks.

Note that since the unit of data when transferring a packet is one quadlet (4 bytes), the byte lengths of data blocks, various headers, etc. are all set to multiples of 4.

FIG. 13 is a view of the format of the source packet header.

As shown in FIG. 13, in 25 bits in the source packet header is written a time stamp utilized for suppressing jitter when for example MPEG (Moving Picture Experts Group)-TS (Transport Stream) data utilized in a digital satellite broadcast etc. of the above DVB method is transmitted by isochronous communication.

Such a packet header, a common isochronous packet (CIP) header, or other data is then added to a predetermined number of data blocks so as to produce the final packets.

FIG. 14 is a view of an example of the basic configuration of an isochronous communication use packet.

As shown in FIG. 14, in a packet for isochronous communication, the first quadlet is comprised of a 1394 header, the second quadlet a Header-CRC, the third quadlet a CIP-header 1, the fourth quadlet a CIP-header 2, the fifth quadlet a source packet header (SPH), and the sixth quadlet and subsequent quadlets the data regions. The final quadlet is a Data-CRC.

The 1394 header is comprised by a "data-length" representing the data length, a "channel" indicating number of the channel (one of 0 to 63) transferred through this packet, a "tcode" representing a code of processing, and a synchronous code "sy" prescribed by each application.

The Header-CRC is an error detection code of the packet header.

The CIP-header 1 is comprised by a source node ID (SID) region for the transmission node number, a data block size (DBS) region for the length of the data block, a fraction number (FN) region for the number of divisions of the data in the formation of the packet, a quadlet padding count (QPC) region for the number of the quadlets of the padding data, a source packet header (SPH) region for the flag showing the existence of the source packet header, and a data block continuity counter (DBC) region for the counter for detecting the number of isochronous packets.

Note that the DBS region shows the number of the quadlets transferred through one isochronous packet.

The CIP-header 2 is comprised by an FMT region for the signal format showing the type of the data to be transferred and a format dependent field (FDF) region utilized corresponding to the signal format.

The SPH header has a time stamp region in which is set a value obtained by adding a fixed delay value when the transport stream packet.

Further, the data CRC is the error detection code of the data field.

The signal processing circuit of the IEEE 1394 serial interface for the transmission and reception of packets having the above structure is mainly constituted by a physical layer circuit for directly driving the IEEE 1394 serial bus and a link layer circuit for controlling the data transfer of the physical layer circuit.

In the isochronous communication system in the IEEE 1394 serial interface, as shown in for example FIG. 15, the link layer circuit 2 is connected to an application, that is, MPEG transporter 1, while the link layer circuit 2 is connected to a serial interface bus BS via a physical layer circuit 3.

In the transfer of data of the IEEE 1394 serial interface, the transmission data and reception data are stored once in a storage device such as a first-in first-out (FIFO) memory (hereinafter simply referred to as an FIFO) provided in the link layer circuit 2. In actuality, an asynchronous packet use FIFO and an isochronous packet use FIFO are separately provided.

As shown in FIG. 11, however, the size of a source packet of a normal MPEG transport stream is changeable, for example, 192 bytes in the DVB and 144 bytes in the DSS.

On the other hand, the size of the FIFO provided in the link layer circuit is set. Therefore, when there is an error in the source packet which is received, it may be considered to propagate the error around the FIFO by providing a register with several consecutive error bits separate from the FIFO.

In this case, however, a separate circuit has to be provided to make it known which source packet stored in the FIFO the error bit is for. This has the disadvantage that the size of the circuit becomes larger.

Further, when using isochronous communication to transmit MPEG-TS data used in the above-mentioned DVB system or other digital satellite broadcasting, the signal processing circuit on the reception side must output transport stream data to the so-called application side that is, the MPEG transporter, based on the time side by the time stamp added to the packet.

In current IEEE 1394 serial interface signal processing circuits, however, no processing system has yet been established for the time stamp added to the received packet.

For example, the case may be considered where an unpredictable value of the time stamp not possible is set and transmitted due to blurring of data or the connection of different systems. It is consequently necessary to establish a system which can operate stably without stopping even in this case.

Further, it is necessary to realize a circuit which can output a packet immediately after a time set for the application side or reception.

Further, when using isochronous communication to transmit MPEG-TS data used in the above-mentioned DVB system or other digital satellite broadcasting, the transmission side signal processing circuit adds a delay in accordance with the amount of data to the time stamp to be added to the packet.

This delay is set to a small value when the amount of the image or other data increases. The reception side outputs transport stream data to the so-called application side, that is, the MPEG transporter.

The reception side stores the received data once in an FIFO or other storage device. The smaller the delay set in accordance with the amount of data at the transmission side, the shorter the time from reception to when the transport stream data to the MPEG transporter is output.

As explained above, however, since there is no system for processing the time stamp added to the packet in current IEEE 1394 serial interface signal processing circuits, when for example the channel is changed and the amount of data increases, unnecessary data ends up being output to the application side regardless of the change of the channel. Alternatively, while the data with a large delay of a time stamp before the change of channel is being stored in the FIFO without being output yet from the reception side, there is the danger that the next data with a small delay will be stored in the FIFO, the positional relationship of the data will be ruined, and overflow or other problems will occur.

SUMMARY OF THE INVENTION

A first object of the present invention is to provide a signal processing circuit which can simply set an error bit without increasing the size of the circuit even with different sizes of source packets and which can realize stable operation without the system stopping even if the time stamp is of a nonexistence value.

A second object of the present invention is to provide a signal processing circuit which can accurately add time information.

A third object of the present invention is to provide a signal processing circuit which can output a packet in a time set for the application side.

A fourth object of the present invention is to provide a signal processing circuit which can prevent damaged data or unnecessary data from being output to the application side even when the time information set in accordance with the amount of data is changed.

To achieve the above object, according to a first aspect of the present invention, there is provided a signal processing circuit for receiving packet data transmitted through a serial interface bus in a predetermined time cycle and outputting the packet data to an application side, comprising a memory means: a first reception circuit for receiving transmitted packets, deciding whether every received packet is transmitted according to the standard, adding an error mark when it is not according to the standard, and storing the result in the memory means; and a second reception circuit for performing process according to the error and outputting the result to the application side when an error mark is added to packet data stored in the memory means.

Preferably, the packets transmitted over the serial bus are given control information indicating whether the transmitted packets are continuous or not; the first reception circuit adds the error mark when deciding from the control information that the received packets are not continuous; and the second reception circuit outputs an error packet to the application side in place of the packet data stored in the memory means when an error mark is added.

Preferably, each of the source packets transmitted over the serial bus is given a source packet header containing time information set with a time for the reception side to output the received data to the application side; the first reception circuit adds the error mark when the time information indicates a time exceeding a predetermined time; and the second reception circuit outputs the packet data stored in the memory means regardless of the time information where an error mark is added.

According to the signal processing circuit of the present invention, the first reception circuit decides if each received packet has been transmitted according to the standard, adds an error mark to a received packet when not according to the standard, and stores the result in the memory means.

Further, the second reception circuit performs processing for the error and outputs the result to the application side when an error mark is added to packet data stored in the memory means.

Alternatively, according to the present invention, the packets transmitted over the serial bus are given control information indicating whether the transmitted packets are continuous or not. The reception circuit adds the error mark when deciding from the control information that the received packet are not continuous.

Further, the second reception circuit outputs an error packet to the application side in place of the packet data stored in the memory means when error mark is added.

Alternatively, according to the present invention, each of the source packets transmitted over a serial interface bus is given a source packet header containing time information set with a time for a reception side to output received data to an application side. The first reception circuit adds an error mark when the time information indicates a time exceeding a predetermined time.

Further, the second reception circuit outputs the data stored in the memory means regardless of the time information when the error mark is added.

According to a second aspect of the invention, there is provided a signal processing circuit for adding to the package data information pertaining to the time during which a reception side outputs received data to the application side and transmitting the result over a serial interface bus in a predetermined time cycle, comprising a counting means for counting the time; a control means able to set a delay time to be added according to the amount of transmission data; a memory means; a first transmission circuit for adding the time information to transmission data based on the delay time set by the control means and storing the result in the memory means; and a second transmission circuit for setting a threshold for deciding whether transmission of a packet is valid or not according to the amount of transmission data, deciding whether the set time information is valid or not from the set threshold, the time information stored in the memory means, and the time counted by the counting means, reading the packet data given the time information and transmitting it as the transmission data when valid, and not reading the packet but processing the next packet when it is invalid.

According to the signal processing circuit of the invention, the first transmission circuit adds the time information to the transmission data based on the delay time set by the control means and stores the result in the memory means.

Further, the second transmission circuit sets a threshold in accordance with the amount of transmission data for deciding if the transmission of the packet is valid and deciding if the set time information is valid or not by the set threshold, the time information stored in the memory means, and the time counted by the counting means.

When the result of the decision is that the transmission is valid, the packet data given the time information is read and transmitted as the transmission data.

When the transmission is invalid, the packet is not read and the next packet is processed.

According to third aspect of the present invention, there is provided a signal processing circuit for receiving packet data given time information set with a time for the reception side to output the received data to the application side and for receiving packet data transmitted over a serial interface bus and outputting the result to the application side in a predetermined time cycle, comprising a counting means for counting time and a reception circuit for reading the time information from the received packet data and outputting the received data to the application side when the time counted by the counting means is larger than the value of the time information.

Preferably, the reception circuit comprises a memory means; a pre-processing circuit for restoring data from the received packet data, storing this in the memory means with the time information, and outputting a stored information signal; a comparison circuit for receiving the stored information signal of the pre-processing circuit, reading the time information stored in the memory means, comparing the time information and the time counted by the counting means, and outputting a data read instruction signal when the count is larger; and a data read control means for reading data stored in the memory means and outputting the same to the application side if receiving the data read instruction signal.

According to a fourth aspect of the present invention, there is provided a signal processing circuit for receiving packet data given time information set with a time for a reception side to output received data to an application side and transmitted over a serial interface bus in a predetermined time cycle and outputting the result to the application side, comprising a reception circuit for outputting the received data to the application side when the time information of the received packet data indicates a time exceeding a predetermined time.

According to a fifth aspect of the present invention, there is provided a signal processing circuit for receiving packet data given time information set with a time for a reception side to output received data to an application side and transmitted over a serial interface bus in a predetermined time cycle and outputting the same to the application side, comprising a counting means for counting time and a reception circuit for reading the time information from the received packet data and outputting the received data to the application side when the time counted by the counting means is larger than the value of the time information or the time information indicates a time exceeding a predetermined time.

Preferably, the reception circuit comprises a memory means; a pre-processing circuit for restoring data from the received packet data, storing the result in the memory means with the time information, and outputting a stored information signal; a comparison circuit for receiving the stored information signal of the pre-processing circuit, reading the time information stored in the memory means, comparing the time information and the time counting by the counting means, and outputting a data read instruction signal when the count is larger; a decision circuit for deciding whether the time information indicates a time exceeding a predetermined time or not and outputting a data read instruction signal when exceeding it; and a data read control means for reading the data stored in the memory means and outputting the result to the application side if receiving the data read instruction signal of the comparison circuit or the decision circuit.

According to the signal processing circuit of the present invention, time information is fetched from the packet data received by the reception circuit and the received data is output to the application side when the value of the time counted by the counting means is larger than the value of the time information.

Further, the received data is output to the application side when the time information of the received packet data indicates a time exceeding a predetermined time.

According to a sixth aspect of the present invention, there is provided a signal processing circuit for receiving packet data given time information set with a time for a reception side to output received data to an application side and transmitted over a serial interface bus in a predetermined time cycle and outputting the result to the application side, comprising a control means for outputting the received data to the application side regardless of the time information of the received packet data.

According to a seventh aspect of the present invention, there is provided a signal processing circuit for receiving packet data given time information set with a time for a reception side output received data to an application side and transmitted over a serial interface bus in a predetermined time cycle and outputting the result to the application side, comprising a counting means for counting time; a reception circuit for reading the time information from the received packet data and outputting the received data to the application side when the value counted by the counting means is larger than the value of the time information; and a control means for causing the reception circuit to output the received data to the application side regardless of the time information by a control signal.

Preferably, the reception circuit comprises a memory means; a pre-processing circuit for restoring data from the received packet data, storing the result in the memory means with the time information, and outputting a stored information signal; a comparison circuit for receiving the stored information signal of the pre-processing circuit, reading the time information stored in the memory means, comparing the time information and the value of the time counted by the counting means, and outputting a data read instruction signal when the count is larger; and a data read control means for reading the data stored in the memory means and outputting it to the application side when receiving the data read instruction signal and receiving the received data stored in the memory means and outputting it to the application side regardless of the time information based on the stored information signal when receiving a control signal from the control means.

According to the signal processing circuit of the present invention, the control means outputs the received data to the application side regardless of the time information of the received packet data.

Further, according to the present invention, the time information is fetched from the received packet data and the received data is output to the application side when the value of the time counted by the counting means is larger than the value of the time information. Further, the control means causes the reception circuit to output the received data to the application side regardless of the time information.

According to a eighth aspect of the present invention, there is provided a signal processing circuit for adding information pertaining to a time for a reception side to output received data to an application side to packet data and transmitting the result over a serial interface bus in a predetermined time cycle, comprising a control means able to set a delay time to be added according to an amount of transmission data; a memory means; a first transmission circuit for adding the time information to the transmission data based on the delay time set by the control means, storing the result in the memory means, and outputting a stored information signal; a comparison circuit for comparing a previously set delay time from the control means and a newly set delay time and outputting a data read control signal when the newly set delay time is shorter; and a second transmission circuit for receiving the stored information signal of the first transmission circuit, reading packet data containing time information stored in the memory means, outputting this as transmission data, and, when receiving the data read control signal, reading packet data given time information based on the newly set delay time and outputting it as transmission data.

Preferably, further it comprises a latch circuit for latching the delay time set by the control means; the first transmission circuit adds the time information based on the delay time latched by the latch circuit; and the comparison circuit compares the delay time set by the control means and the delay time latched by the latch circuit.

According to the signal processing circuit of the present invention, the first transmission circuit adds time information to the transmission data based on a delay time set by the control means, stores the result in the memory means, and outputs a stored information signal to the second transmission circuit.

The comparison means compares the delay time previously set by the control means and a newly set delay time and outputs a data read control signal to the second transmission circuit when the newly set delay time is shorter.

The second transmission circuit receives the stored information signal of the first transmission circuit, reads the packet data containing the time information stored in the memory means, and transmits the result as the transmission data.

When receiving a data read control signal from the comparison circuit, the packet data given the time information based on the newly set delay time is read and transmitted as the transmission data.

BRIEF DESCRIPTION OF THE DRAWINGS

These and other objects and features of the present invention will become clearer from the following description of the preferred embodiments given with reference to the attached drawings, in which:

FIG. 9 is a block diagram of the configuration of a seventh embodiment of an MPEG use signal processing circuit according to the present invention applied to the IEEE 1394 serial interface;

FIG. 10 is a block diagram of an example of the configuration of a time stamp processing circuit of an isochronous communication system reception processing according to the seventh embodiment;

FIGS. 11A and 11B are views of a byte size of a source packet in isochronous communication, in which FIG. 11A is a view of the packet size in the DVB method and FIG. 11B is a view of the packet size in the DSS method;

FIG. 12 is a view of an example of the correspondence between original data when data is transmitted through isochronous communication of the IEEE 1394 standard and an actually transmitted packet;

DESCRIPTION OF THE PREFERRED EMBODIMENTS

First Embodiment

Figure 1:
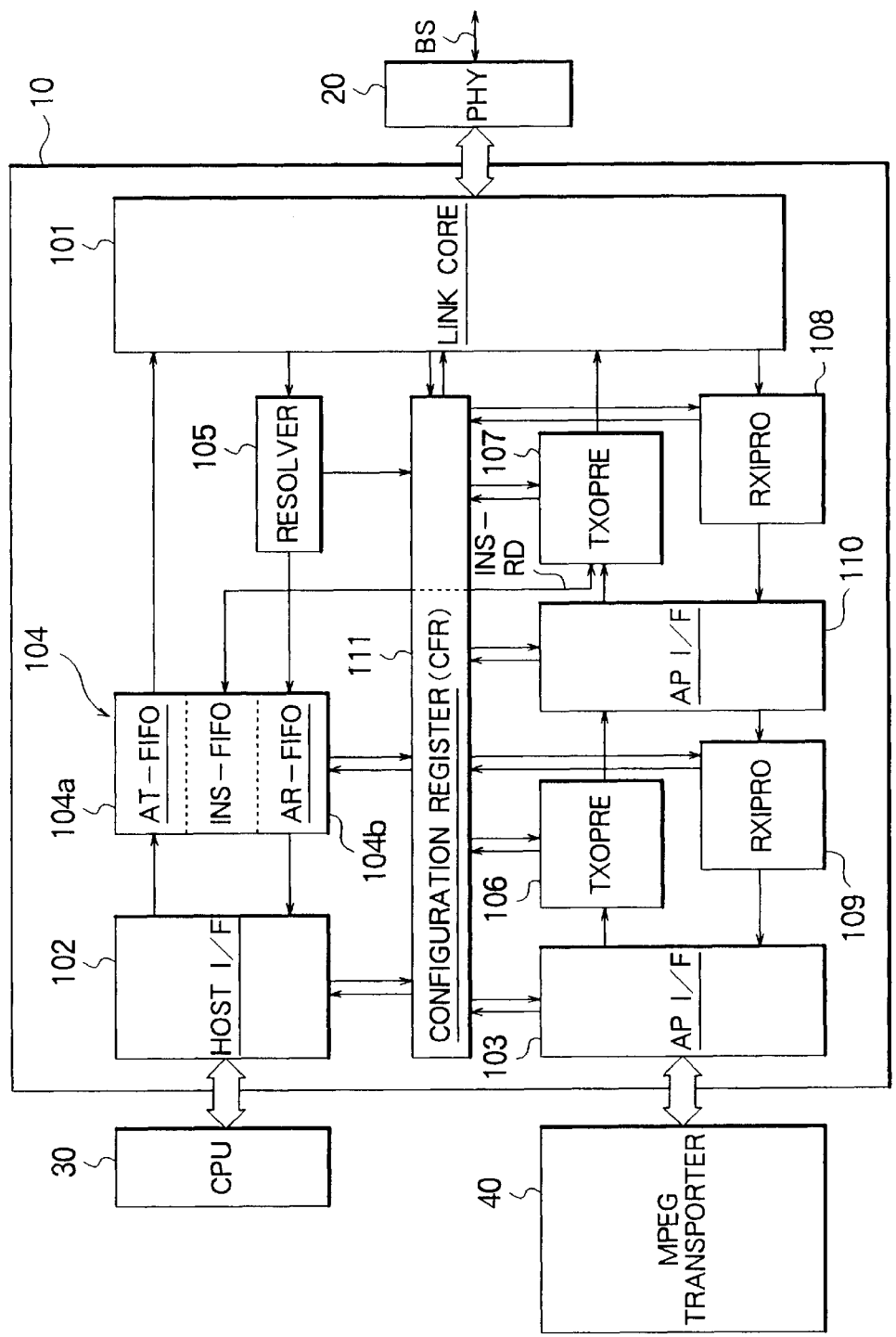
FIG. 1 is a block diagram of the configuration of a first embodiment of an MPEG use signal processing circuit according to the present invention applied to an IEEE 1394 serial interface.

FIG. 1 is a block diagram of the configuration of a first embodiment of an MPEG use signal processing circuit according to the present invention applied to an IEEE 1394 serial interface.

This signal processing circuit is constituted by a link layer circuit 10, a physical layer circuit 20, and a central processing unit (CPU) 30 serving as a host computer. Further, 40 denotes an MPEG transporter.

The link layer circuit 10 controls asynchronous transfer and isochronous transfer and controls the physical layer circuit 20 under the control of the CPU 30.

More specifically, as shown in FIG. 1, the circuit is constituted by a link core 101; a host interface circuit (Host I/F) 102; an application interface circuit (AP I/F) 103; an asynchronous communication use FIFO 104 comprising a transmission use FIFO (AT-FIFO) 104a and a reception use FIFO (AR-FIFO) 104b; a self ID use resolver 105; an isochronous communication use pre-transmission processing circuit (TXOPRE) 106; an isochronous communication use post-transmission processing circuit (TXOPRO) 107; an isochronous communication use pre-reception processing circuit (TXIPRE) 108; an isochronous communication use post-reception processing circuit (TXIPRO) 109; an isochronous communication use FIFO (I-FIFO) 110; and a configuration register (hereinafter referred to as a CFR) 111.

In the circuit of FIG. 1, an asynchronous communication system circuit is constituted by the host interface circuit 102, transmission use FIFO 104a, FIFO 104b for reception of asynchronous communication, and the link core 101.

Further, an isochronous communication system circuit is constituted by the application interface circuit 103, pre-transmission processing circuit 106, post-transmission processing circuit 107, pre-reception processing circuit 108, post-reception processing circuit 109, FIFO 110, and link core 101.

The link core 101 is constituted by a transmission circuit of an asynchronous communication use packet and an isochronous communication use packet, a reception circuit, an interface circuit with the physical layer circuit 20 for directly driving the IEEE 1394 serial bus BS of these packets, a cycle timer reset at every 125 $\mu$s, a cycle monitor, and a CRC circuit. Then, the time data etc. of the cycle timer for example are supplied to the isochronous communication system processing circuit through the CFR 111.

The host interface circuit 102 mainly performs arbitration of writing, reading, etc. of the asynchronous communication use packet with the CPU 30 serving as the host computer and the transmission use FIFO 104a and reception use FIFO 104b, and arbitration of the transmission and reception of various data with the CPU 30 and CFR 111.

For example, the time stamp use delay time Txdelay set in the source packet header (SPH) of the isochronous communication use packet is set from the CPU 30 into the CFR 111 through the host interface 102.

The asynchronous communication use packet to be transmitted to the IEEE 1394 serial bus BS is stored in the transmission use FIFO 104a, while the asynchronous communication use packet transmitted through the IEEE 1394 serial bus BS is stored in the reception use FIFO 104b.

The application interface circuit 103 performs the arbitration of the transmission and reception of the MPEG transport stream data containing clock signals and control signals with the MPEG transporter 40, the isochronous communication use pre-transmission processing circuit 106, and the isochronous communication use post-reception processing circuit 109.

The resolver 105 analyzes the self ID packet transmitted through the IEEE 1394 serial bus BS and stores the same in the CFR 111.

The pre-transmission processing circuit 106 receives the MPEG transport stream data from the MPEG transporter 40 via the application interface circuit 103, and then adjusts the data length in units of quadlets (4 bytes) for the isochronous communication of the IEEE 1394 standard, adds a source packet header (SPH) of 4 bytes, and stores the result in the FIFO 110.

The pre-transmission processing circuit 106 sets a time stamp for determining the data output time on the reception side when adding the source packet header. This is set as follows.

First, the value of the internal cycle register is latched at the time of reception of the final data of the packet from the MPEG transporter 40. Next, the delay time Txdelay set in the CFR 111 is added to the value of the cycle register from the CPU 30 via the host interface 102. Then, the added value is inserted (set) in the source packet header of the received packet as the time stamp.

Figure 2:
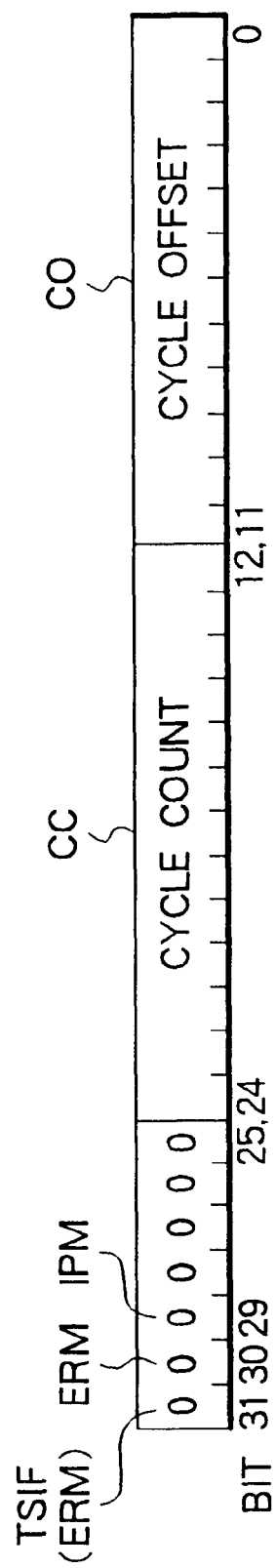
FIG. 2 is a view for explaining the concrete configuration of a time stamp.

FIG. 2 is a view for explaining the concrete configuration of the time stamp in the source packet header.

As shown in FIG. 2, the time stamp for determining the time of data output on the reception side shows the current time by 25 bits. Namely, the time stamp is comprised by 25 bits. The lower significant 12 bits are allocated as a cycle-offset (CO) region, while the upper significant 13 bits are allocated as a cycle-count (CC) region.

The cycle-offset counts the 125 $\mu$s of 0 to 3071 (12b 101111111111) (clock CLK=24.576 MHz), while the cycle count counts one second from 0 to 7999 (13b 1111100111111).

Accordingly, in principle, the lower significant 12 bits of the time stamp never show more than 3072, while the upper significant 13 bits never indicate more than 8000.

Figure 14:
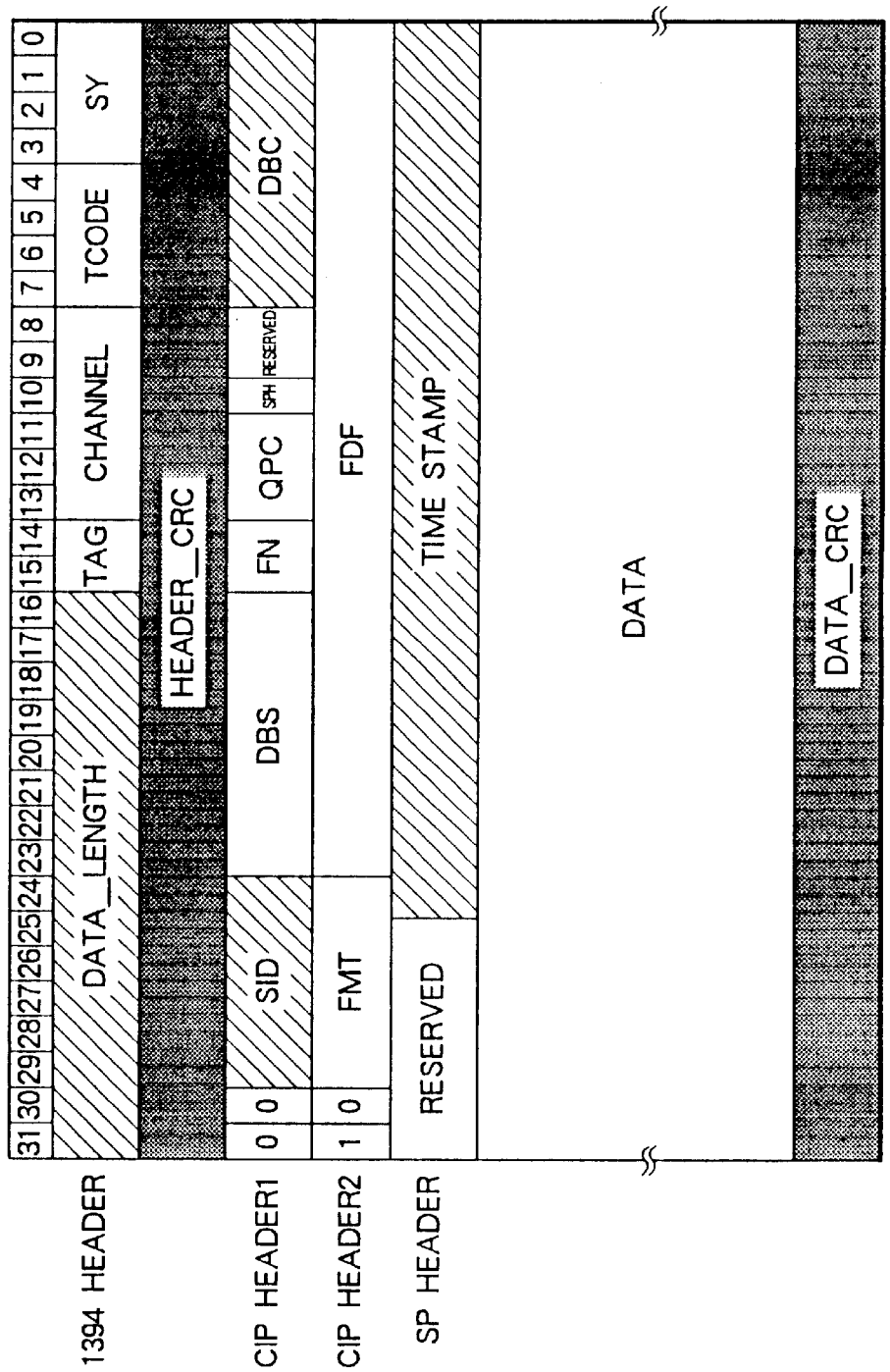
FIG. 14 is a view of an example of the basic configuration of an isochronous communication use packet.
Figure 15:
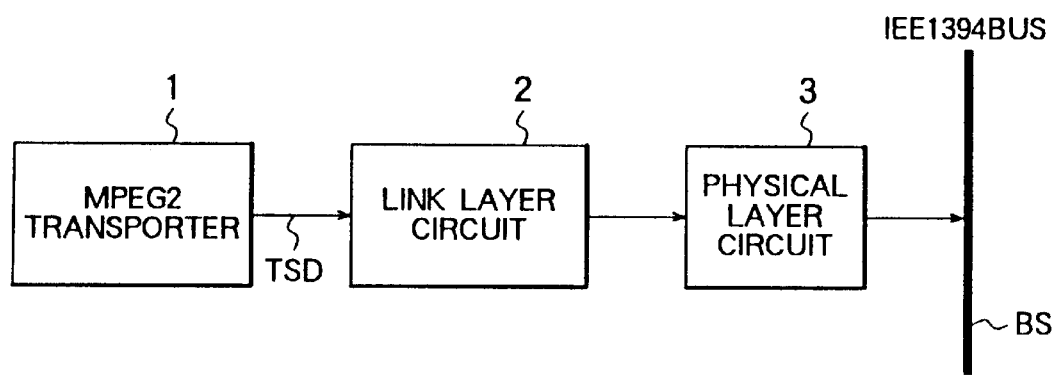
FIG. 15 is a block diagram of the basic configuration of an isochronous communication system circuit in an IEEE 1394 serial interface.

The post-transmission processing circuit 107 adds the 1394 header and CIP headers 1 and 2 to the data containing the source packet header stored in the FIFO 110 as shown in FIG. 14 and outputs the same to the transmission circuit of the link core 101.

Specifically, as shown in FIG. 14, the 1394 header comprised by the "data-length" indicating the data length, the "channel" indicating the number of the channels through which the packet is transferred (any of 0 to 63), the "tcode" indicating the code of processing, and the "synchronization code sy" defined by the applications; the CIP header 1 comprised by a source node ID (SID) region for the transmission node number, a data block size (DBS) region for the length of the data block, a fraction number (FN) region for the division of the data for forming packets, a quadlet padding count (QPC) region for the number of quadlets of the padding data, a source packet header (SPH) region for a flag representing the existence of the source packet header, and a data block continuity counter (DBC) region for the counter for detecting the number of the isochronous packets; and the CIP header 2 comprised by an FMT region for the signal format representing the type of the data to be transferred and a format dependent field (FDF) region utilized corresponding to the signal format are added.

The pre-reception processing circuit 108 receives the isochronous communication use packets transmitted through the IEEE 1394 serial bus BS in for example a divided manner via the link core 101, analyzes the contents of the CIP headers 1 and 2, etc., restores the data, and stores the source packet header and data in the FIFO 110.

Then, in the processing for analysis of the header, since the data block continuity counter (DBC) set in the first quadlet of the CIP header 1 indicates continuity at the time of normal transmission of continuous data, it indicates discontinuity when it detects the discontinuity of the DBC, namely, when it detects the discontinuity of a source packet. Therefore, it sets an error bit ERM as an error mark for indicating packet loss.

The error bit ERM is allocated to the one bit among the upper significant seven bits of the source packet header, for example, the second bit 30 from the most significant bit as shown in for example FIG. 2.

Note that before setting (writing) the error bit ERM, the information of the upper significant seven bits of the source packet header is retracted for storage in the CFR 111 (register SPH-RSV).

Further, the number of the error packets is rewritten in the information of the time stamp, but there is no problem since the error bit is set and the time stamp is not used in the post-transmission processing circuit 107.

The post-reception processing circuit 109 reads the time data of the time stamp of the source packet header stored in the FIFO 110, compares the read time stamp data (TS) and the cycle time (CT) from the cycle timer in the link core 101, and outputs the data except the source packet header stored in the FIFO 110 through the application interface circuit 103 to the MPEG transporter 40 as the MPEG use transport stream data when the cycle time CT is larger than the time stamp data TS.

When reading from the FIFO 110, when the error bit ERM is set to "1", that is, when outputting a packet with a DBC discontinuity mark set, first, the circuit resets the error bit and outputs one dummy error packet. Note that the error packet shows discontinuity of the DBC, so a packet not in the FIFO 110 is inserted.

Note that the next data is read normally from the FIFO 110 since the DBC discontinuity mark is no longer set.

Next, an explanation will be made of the reception operation of an isochronous communication use packet transmitted through the IEEE 1394 serial bus BS.

The isochronous communication use packet transmitted through the IEEE 1394 serial bus BS is input to the pre-reception processing circuit 108 through the link core 101.

The pre-reception processing circuit 108 analyzes the contents of the 1394 header and CIP headers 1 and 2 etc. of the received packet, restores the data, and writes the source packet header and data in the FIFO 110.

In the processing for analysis of the header, the circuit decides whether a received source packet is normally continuous or discontinuous from the data of the DBC region set in the first quadlet of the CIP header 1.

When the result of the decision is that the packet is normal, the error bit ERM allocated to the 2nd bit 30 from the most significant bit among the upper significant seven bits of the source packet header is held at "0". On the other hand, where it is decided that the packet is discontinuous, the error bit is set to "1".

Note that before setting (writing) the error bit ERM, the information of the upper significant seven bits of the source packet header is retracted for storage in the CFR 111(register SPH-RSV).

Then, the post-reception processing circuit 109 reads the time data of the time stamp of the source packet header stored in the FIFO 110 and compares the read time stamp data (TS) and the cycle time (CT) from the cycle timer in the link core 101. As a result, when the cycle time CT is larger than the time stamp data TS, it outputs the data minus the source packet header stored in the FIFO 110 via the application interface circuit 103 to the MPEG transporter 40 as MPEG use transport stream data.

In outputting the packet data, when reading the source packet header from the FIFO 110, when the error bit ERM is set to "1", first it resets the error bit is reset and then one dummy error packet is generated and output.

The next data is read as usual from the FIFO 110 since the DBC discontinuity mark is no longer set.

As explained above, according to the first embodiment, since the signal processing circuit 10 is provided with the pre-reception processing circuit 108 for deciding from the data of the DBC region of the CIP header 1 whether the received packet is normally continuous or discontinuous, setting the error bit ERM allocated to one bit of the upper significant seven bits of the source packet header, for example, the bit 30, to "1" and writing it in the FIFO 110 when deciding it is discontinuous and is provided with the post-reception processing circuit 109 for, when reading from the FIFO 110, outputting the data stored in the FIFO 110 to the application side when the error bit is set to "0" and resetting the error bit and outputting a dummy error packet when the error bit is set to "1", there are advantages that it is possible to set the error bit simply without increasing the size of the circuit even if the size of the source packet is variable.

Second Embodiment

Next, an explanation will be made of a second embodiment of an MPEG use signal processing circuit according to the present invention applied to an IEEE 1394 serial interface.

In the above-mentioned first embodiment, mention was made of the case where discontinuity of the source packet is detected as an example of setting the error bit. In the second embodiment, the signal processing circuit is constituted so as to set the error bit serving as the error mark at the pre-reception processing circuit 108 when it detects an impossible value of the time stamp and so as to output the received data stored in the FIFO 110 compulsorily to the application side at the post-reception processing circuit 109 when the error bit is set.

As explained above, the lower significant 12 bits of the time stamp never show more than 3072, while the upper significant 13 bits never indicate more than 8000.

However, the case where an unforeseeable setting is made due to blurring of the data or connection of different systems and the lower significant 12 bits of the time stamp show more than 3072 or the upper significant 13 bits indicate more than 8000 is assumed.

In this case, for the error bit, the most significant bit (MSB) among the upper significant seven bits of the source packet is allocated as a time stamp invalid flag (TSIF) as shown for example in FIG. 2.

The pre-reception processing circuit 108 stores the upper significant seven bits of the source packet header in the CFR 111, then first initializes the TSIF to "0" and sets the TSIF to "1" when there is an impossible value of the time stamp.

Accordingly, in the second embodiment, when the cycle time CT is larger than the time stamp data TS, the received data stored in the FIFO 110 is output to the application side of course in the usual operation, but the received data stored in the FIFO 111 is instantly output to the application side when the lower significant 12 bits indicate more than 3072 or the upper significant 13 bits indicate more than 8000.

According to the second embodiment, in the same way as the above-mentioned first embodiment, there are the advantages that it is possible to set the error bit simply and realize stable operation without increasing the size of circuit even if the size of the source packet is variable.

Note that, in the first and second embodiments, the error bit is allocated to one bit among the upper significant seven bits of the source packet header (SPH), but if configured so that error marks are provided for each of the packets to be stored in the FIFO 110, needless to say the present invention is not restricted to this.

Namely, it is sufficient to provide one error mark for each of the so-called packet banks of the FIFO.

By allocating one bit among the upper significant seven bits of the source packet header (SPH), however, there is the advantage that there is no problem even if the size of packet changes and the number of the packets in the FIFO changes.

Third Embodiment

Figure 3:
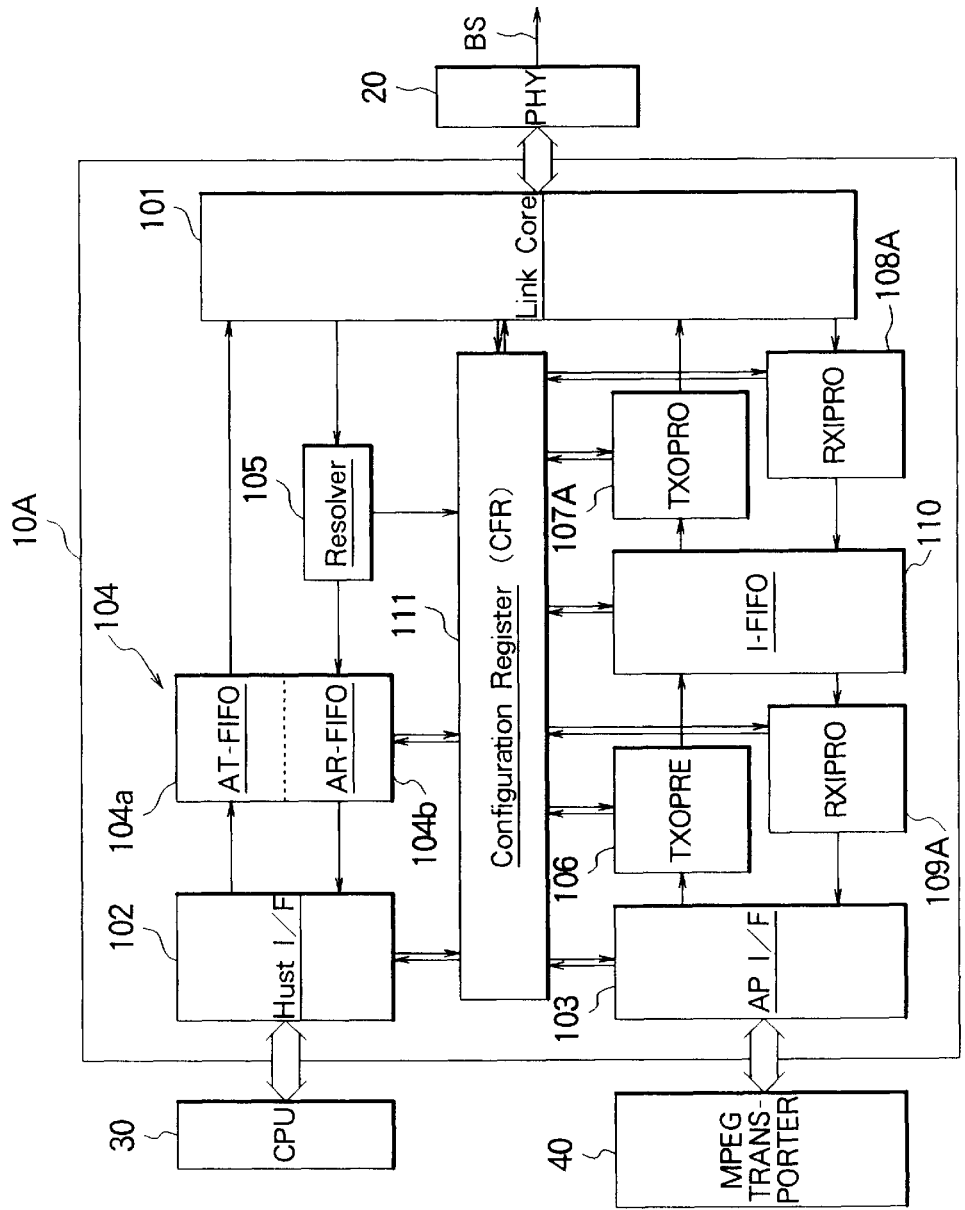
FIG. 3 is a block diagram of the configuration of a third embodiment of an MPEG use signal processing circuit according to the present invention applied to IEEE 1394 serial interface.

FIG. 3 is a block diagram of the configuration of a third embodiment of an MPEG use signal processing circuit according to the present invention applied to an IEEE 1394 serial interface.

The differences of the third embodiment from the first embodiment are that the post-transmission processing circuit 107A sets a late threshold LTH according to the fractions of the unit packets set in the CFR 111 by the CPU 30, decides from the relationship between the value TS of the time stamp set in the source packet header of the source packet stored in the FIFO 110 by the pre-transmission processing circuit 106 and the cycle time CT from the cycle timer in the link core 101, that is, a current time CT, and the late threshold LTH, if the time stamp set by the pre-transmission processing circuit 106 and stored in the FIFO 110 is valid or not, transmits a packet when the time stamp is valid, and does not transmit it but processes the next packet when it is invalid.

Below, an explanation will be made of the specific functions of the post-transmission processing circuit 107A, the pre-reception processing circuit 108A, and the post-reception processing circuit 109A in the link layer circuit 10A differing in function from the first embodiment.

The post-transmission processing circuit 107A adds the 1374 header and CIP headers 1 and 2 to the data containing the source packet header stored in the FIFO 110 as shown in FIG. 14 and outputs the result to the transmission circuit of the link core 101.

At the time of output, the post-transmission processing circuit 107A performs the late decision processing based on the relationship between the value TS of the time stamp set in the source packet header of the source packet stored in the FIFO 110 (the value of the cycle count (CC) region) and the cycle time CT from the cycle timer in the link core 101, that is, the current time TS, and decides whether to transmit for every packet.

Then, in the late decision processing, the circuit sets the late threshold LTH according to the fractions (or compositions) of unit packets set in the CFR 111 by the CPU 30 and uses the late threshold LTH as one condition of the decision processing.

The late threshold LTH is changed according to how many packets are to be transmitted in one cycle. For example, it is set to "11" at the time of eight fractions.

Note that the late processing is processing for not transmitting a packet based on the relationship between the value TS of the time stamp and the current time CT when even if the packet is transmitted and reaches the reception side, time has ended up passing and it ends up becoming meaningless.

Figure 4:
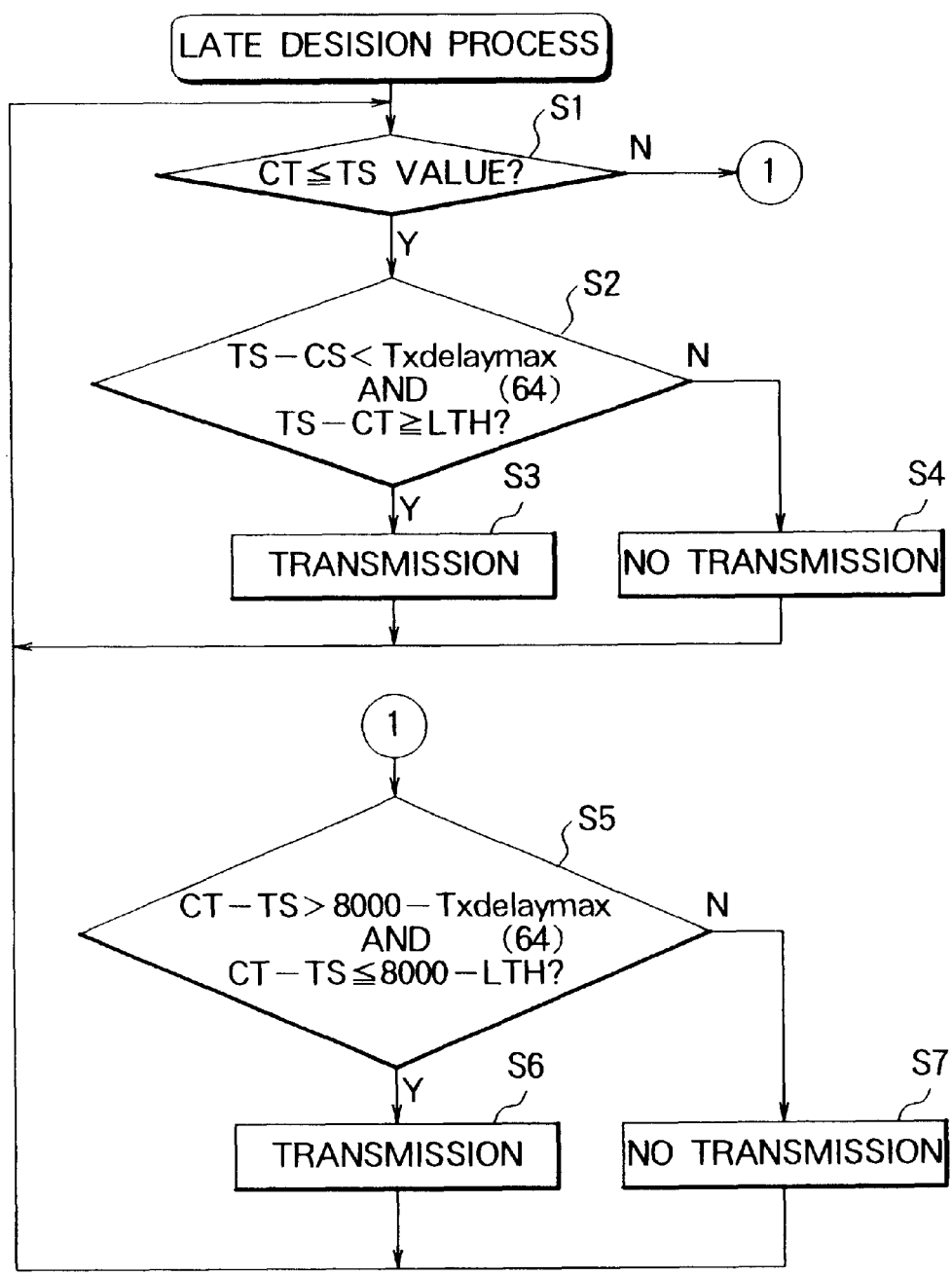
FIG. 4 is a flow chart for explaining an operation of a late decision processing of a post-transmission processing circuit according to the present invention.

Below, an explanation will be made of the specific late decision processing of the post-transmission processing circuit 107A with reference to the flow chart of FIG. 4.

First, at step S1, the circuit decides if the cycle time CT from the cycle timer in the link core 101, that is, the current time CT, is less than the value TS of the time stamp.

When a positive decision is obtained at step S1 (CT≦TS), it performs the decision operation of step S2.

Namely, it checks if the value TS of the time stamp is valid or not.

More specifically, since the value TS of the time stamp is the current time CT plus the maximum "63", the time stamp value TS minus the current time CT should be smaller than the maximum value Txdelay max (64) of the delay time Txdelay.

Accordingly, the circuit decides if the result of the subtraction is smaller than the maximum value Txdelay or not and decides if the time stamp value TS minus the current time CT larger than the late threshold LTH set according to the fractions of the packet.

If a positive decision is obtained, the circuit adds the 1394 header and CIP headers 1 and 2 to the source packet stored in the FIFO 110, outputs the result to the transmission circuit of the link core 101 (S3), then shifts to the processing of step S1 for processing the next packet.

When a negative decision is obtained, it considers the value TS of the time stamp invalid, does not transmit the packet thereof, and shifts to the processing of step S1 for processing the next packet (S4).

On the other hand, when the circuit decides at step S1 that the current time CT is larger than the value TS of the time stamp, it decides at step S5 if the current time CT minus the time TS shown by the time stamp is larger than 8000 minus 64 or not and decides if the current time CT minus the time TS shown by the time stamp is less than 8000 minus the late threshold LTH or not (S5).

Namely, while there is 0 second between values TS of the time stamp, it checks if the current time CT has not actually passed.

Then, at step S5, when a positive decision is obtained, it is decided that the time stamp is valid and that the cycle time is not past yet. The circuit then adds the 1394 header and CIP headers 1 and 2 to the source packet stored in the FIFO 110, outputs the result to the transmission circuit of the link core 101 (S6), and shifts to the processing of step S1 for processing the next packet.

When a negative decision is obtained at step S5, it is decided that the cycle time has past the time indicated by the time stamp, the value TS of the time stamp is deemed invalid, the packet thereof is not transmitted, and the circuit shifts to the processing of step S1 for processing the next packet (S7).

The pre-reception processing circuit 108A receives the isochronous communication use packet transmitted over the IEEE 1394 serial bus BS via the link core 101, analyzes the contents of the 1394 header, CIP headers 1 and 2, etc. of the received packet, restores the data, and stores the source packet header and data in the FIFO 110.

The post-reception processing circuit 109A reads the time data of the time stamp of the source packet header stored in the FIFO 110 into the internal register, compares the read time stamp data (TS) and the cycle time (CT) from the cycle timer in the link core 101, and, when the cycle time CT is larger than the time stamp data TS, outputs the data other than the source packet header stored in the FIFO 110 via the application interface circuit 103 to the MPEG transporter 40 as the MPEG use transport stream data.

Next, an explanation will be made of the operation of setting the time stamp in the isochronous communication use packet and transmitting the result to the IEEE 1394 serial bus BS with reference to the flow chart of FIG. 4.

As the time of transmission, the delay time Txdelay to be added as the time stamp by the CPU 30 is set to the CFR 111, and, for example, the fractions of the unit packets to be transmitted is set in the CFR 111.

Then, the pre-transmission processing circuit 106 receives the MPEG transmit stream data from the MPEG transporter 40 via the application interface circuit 103, adjusts the data lengths to quadlets (4 byte) units for isochronous communication of the IEEE 1394 standard, adds the source packet header (SPH) of 4 bytes, and stores the result in the FIFO 110.

Note that when the source packet header is added, the pre-transmission processing circuit 106 adds the time stamp for determining the data output time of the reception side, comprising the value of the internal cycle register at the timing when the final data of the packet is fetched from the MPEG transporter 10 plus the delay time Txdelay set in the CFR 111 from the CPU 30 through the post interface 102, to the source packet header of the received packet.

The post-transmission processing circuit 107A sets the late threshold LTH according to the fractions of the unit packets set in CFR 111 from the CPU 30.

The circuit then decides if the time stamp set by the pre-transmission processing circuit 106 and stored in the FIFO 110 is valid or not based on the relationship between the value TS of the time stamp set in the source packet header of the source packet stored in the FIFO 110 and the cycle time CT from the cycle time in the link core 101, that is, the current time CT, and the late threshold LTH.

Namely, the circuit decides if the cycle time CT from the cycle timer in the link core 101, that is, the current time CT, is less than the value TS of the time stamp or not. When the result is that the current time CT is less than the value TS of the time stamp, the circuit decides if the value TS of the time stamp minus the current time CT is smaller than the maximum value Txdelay max (64) of the delay time Txdelay and decides if the value TS of the time stamp minus the current time CT is larger than the late threshold LTH set according to the fractions of the packets.

Then, when the value TS of the time stamp minus the current time CT is smaller than the maximum value Txdelay max (64) of the delay time Txdelay and the value TS of the time stamp minus the current time CT is larger than the late threshold LTH, the circuit adds the 1394 header and CIP headers 1 and 2 to the source packet stored in the FIFO 110 and outputs the result. Next, the next packet is processed.

On the other hand, when the value TS of the time stamp minus the current time CT is larger than the maximum value Txdelay max of the delay time Txdelay or the value TS of the time stamp minus the current time CT is smaller than the late threshold LTH, the circuit decides that the value TS of the time stamp is invalid, does not transmit the packet, and proceeds to the processing of the next packet.

Further, when the circuit decides that the current time CT is larger than the value TS of the time stamp, it decides if the current time CT minus the value TS of the time stamp is larger than 8000 minus 64 and decides if the current TS minus the value TS of the time stamp is less than 8000 minus the late threshold LTH.

Then, where the current time CT minus the value TS of the time stamp is larger than 8000 minus 64 and the current time CT minus the value TS of the time stamp is less than 8000 minus the late threshold LTH, the circuit adds the 1394 header and CIP headers 1 and 2 to the source packet stored in the FIFO 110 and outputs the result. Then, the next packet is processed.

On the other hand, when the current time CT minus the value TS of the time stamp is smaller than the current time CT minus the value TS of the time stamp is larger than 8000 minus the late threshold LTH, the circuit considers the value TS of the time stamp as invalid, does not transmit the packet, and proceeds to the processing of the next packet.

The isochronous communication use packet transmitted by the transmission side over the IEEE 1394 serial bus BS deeming that the time stamp is valid is input to the pre-reception processing circuit 108A via the link core 101.

The pre-reception processing circuit 108A analyzes the contents of the 1394 header, CIP headers 1 and 2, etc. of the received packet, restores the data, and stores the source packet header and the data in the FIFO 110.

The post-reception processing circuit 109A reads the time data of the time stamp of the source packet header stored in the FIFO 110 is read. Then, it compares the read time stamp data (TS) and the cycle time (CT) from the cycle timer in the link core 101. When the cycle time CT is larger then the time stamp data TS, the circuit outputs the data other than the source packet header stored in the FIFO 110 via the application interface circuit 103 to the MPEG transporter 40 as MPEG use transport stream data.

As explained above, according to the third embodiment, the post-transmission processing circuit 107A sets a late threshold LTH according to the fractions of the unit packets set in the CFR 111 by the CPU 30, decides if the time stamp set by the pre-transmission processing circuit 106 and stored in the FIFO 111 is valid or not based on the relationship between the value TS of the time stamp set in the source packet header of the source packet stored in the FIFO 110 by the pre-transmission processing circuit 106 and the cycle time CT from the cycle timer In the link core 101, that is, the current time CT, and the late threshold LTH, transmits the packet when it is valid, and does not transmit it but processes the next packet when it is invalid, therefore it is possible to automatically perform late processing of the transmission and realize accurate packet transmission.

Fourth Embodiment

Figure 5:
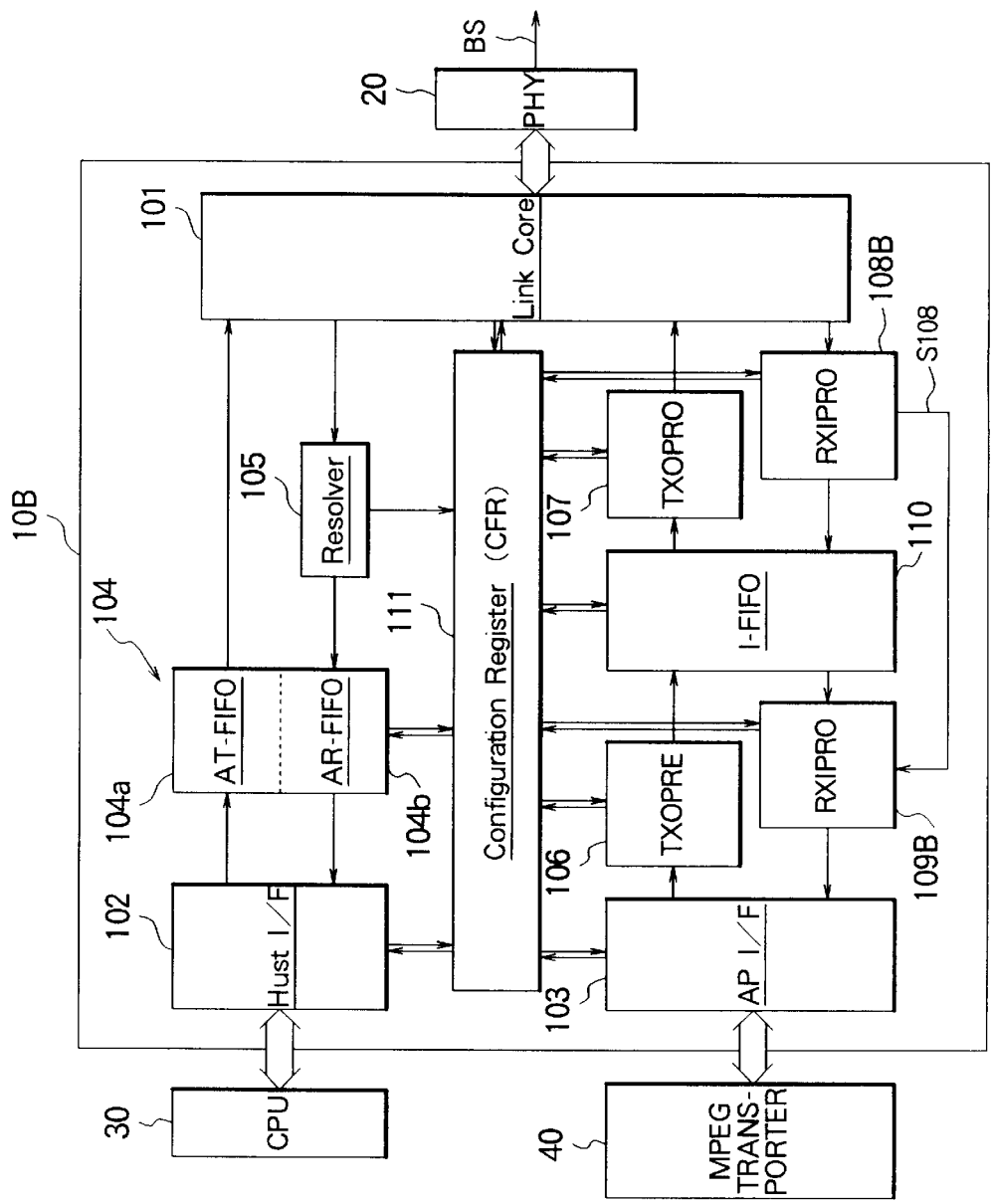
FIG. 5 is a block diagram of the configuration of a fourth embodiment of an MPEG use signal processing circuit according to the present invention applied to the IEEE 1394 serial interface.

FIG. 5 is a block diagram of the configuration of a fourth embodiment of an MPEG use signal processing circuit according to the present invention applied to an IEEE 1394 serial interface.

The differences of the fourth embodiment from the first embodiment are that the pre-reception processing circuit 108B outputs a stored information signal S108, which indicates that the received data has been stored in the FIFO 110, 108B, to a post-reception processing circuit 109B each time writing a packet and that the post-reception processing circuit 109B compares the time stamp data TS added to the received data and the cycle time CT from the inner cycle counter and outputs the received data stored in the FIFO 110 when the cycle time CT is larger than the time stamp data TS (CT>TS).

Below, an explanation will be made of the specific functions of the pre-reception processing circuit 108B, and the post-reception processing circuit 109B which differ in function from the first embodiment.

The pre-reception processing circuit 108B receives the isochronous communication use packet transmitted over the IEEE 1394 serial bus SB via the link core 101, analyzes the contents of the 1394 header, CIP headers 1 and 2, etc. of the received packet, restores the data, stores the source packet header and data in the FIFO 110, and outputs a stored information signal S108, which indicates that the received data has been written in the FIFO, to the post-reception processing circuit 109B each time a packet is written.

The post-reception circuit 109B is provided with an inner register (REG) 1091, a comparison circuit (COMP) 1092, and a data read control circuit (CTL) 1093.

The post-reception processing circuit 109B reads the time data of the time stamp of the source packet header stored in the FIFO 110 to the inner register 1091 each time it receives a stored information signal S108 from the pre-reception processing circuit 10B, compares the read time stamp data (TS) and the cycle time (CT) from the cycle timer in the link core 101, and outputs a data read instruction use pulse signal S1092 to the data read control circuit 1093 when the cycle time CT is larger than the time stamp data TS. Note that the specific operation of the comparison of the comparison circuit 1092 is described later.

The data read control circuit 1093, when receiving the pulse signal S1092, outputs a data read signal S1093 and outputs the data other than the source packet header stored in the FIFO 110 via the application interface circuit 103 to the MPEG transporter 40 as the MPEG use transport stream data.

Next, an explanation will be made of an operation when receiving the isochronous communication use packet transmitted over the IEEE 1394 serial bus BUS, especially the specific operation of comparison of the comparison circuit 1092 in the post-reception processing circuit 109B, with reference to the flow chart of FIG. 7.

The isochronous communication use packet transmitted over the IEEE 1394 serial bus BS is input to the pre-reception circuit 108B via the link core 101.

The pre-reception processing circuit 108B analyzes the contents of the 1394 header, CIP headers 1 and 2, etc. of the received packet, restores the data, and stores the source packet header and the data in the FIFO 110. Then, it outputs a stored information signal S108, which indicates that the data has been written in the FIFO 110, to the post-reception processing circuit 109B each time a packet is written.

Figure 7:
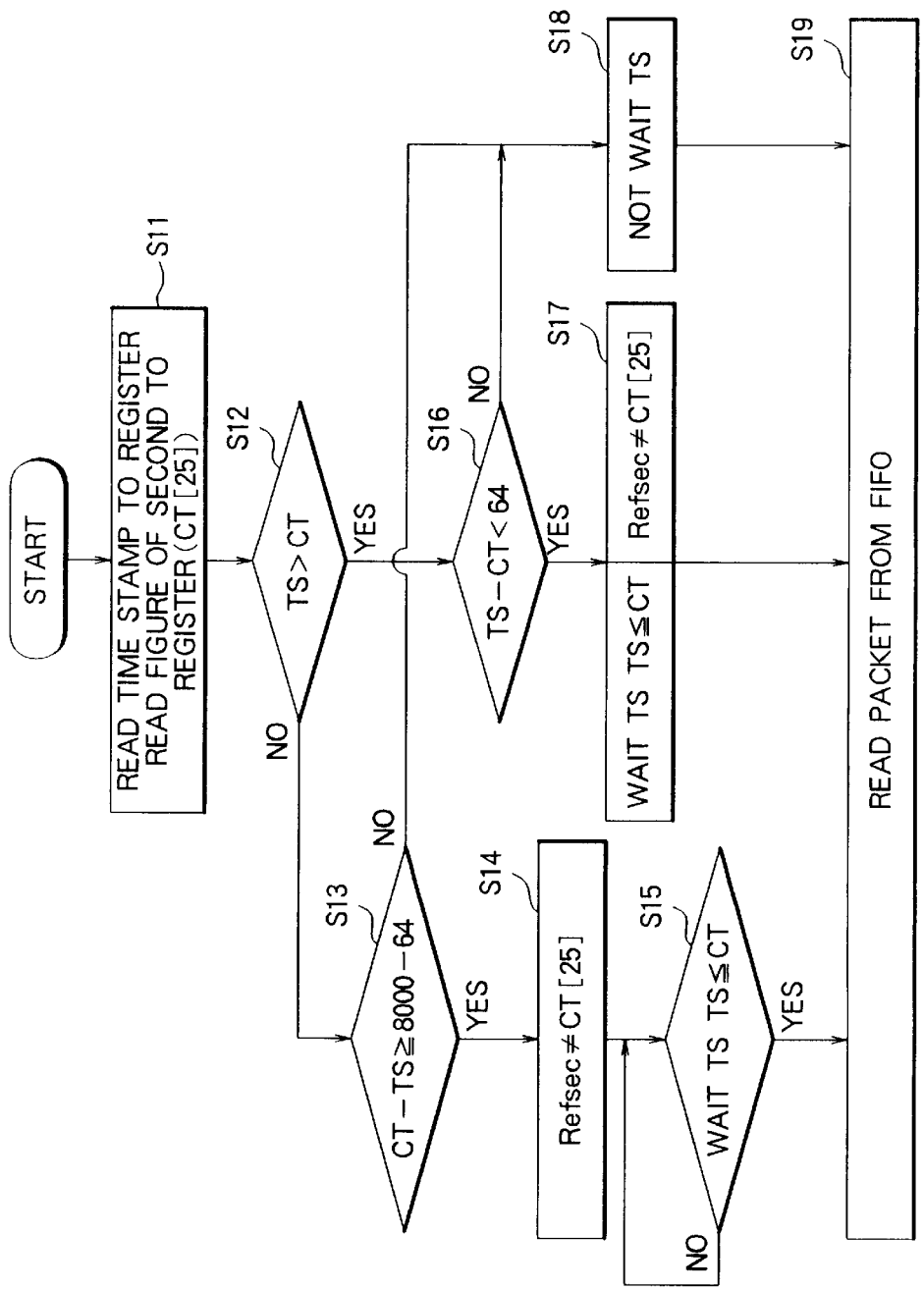
FIG. 7 is a view for explaining an operation of an isochronous communication system reception processing circuit according to the fourth embodiment.

The post-reception processing circuit 109B, as shown in FIG. 7, receives the signal S108, reads the time stamp from the FIFO 110 to the inner register 1091, and reads the cycle time CT "25" at the time, that is, the second value of the current time, to the inner register 1091 (S11).

The comparison circuit 1092 compares the time stamp data TS read to the inner register 1091 and the cycle time CT from the cycle timer in the link core 101, that is, the current time CT (S12).

At this time, the circuit checks if the time TS of the time stamp is separated by the position of 0 second. This is because when separated by 0 second, processing by simple comparison of size is not possible.

When the circuit decides at step S12 that the time stamp data TS is smaller than the current time CT, it decides at step S13 if the current time CT minus the value TS of the time stamp is larger than 8000 minus 64.

Namely, it waits for the time stamp for 0 second, but checks if the current time CT has not actually passed.

Note that, the cycle time is comprised of 25 bits. The upper significant 13 bits are allocated as a cycle-count region, while the lower significant 12 bits are allocated as a cycle-offset region.

Further, at the transmission side, the cycle-count of the time stamp is given just a maximum 63 bits of a delay value Txdelay.

The cycle-count of the cycle time loops from 0 to 7999.

Therefore, when a positive decision is obtained at step S13, the circuit decides that the time stamp is valid and the cycle time has not yet passed and then proceeds to the processing of step S14.

When a negative decision is obtained at step S13, the circuit decides that the cycle time has exceeded the time shown by the time stamp and proceeds to the processing of step S18.

At step S14, the circuit waits for the time stamp data TS for 0 second between the current time CT and the time stamp TS, so cannot perform a simple comparison with the current time CT.

Here, it waits until the second value CT "25" of second of the current time read to the register at step S11 no longer matches with the current time CT "25" (Refsec).

When no longer matching, the circuit decides that the second figures of the time stamp data TS and current time CT have become the same (the time stamp TS cannot be waited for more than 1 second).

When the condition of step S14 is satisfied, the circuit decides at step S15 if the time stamp data TS has become equal to or lower than the current time CT (TS$\leq$CT) or not (simple comparison).

When the time stamp data TS has become equal to or lower than the current time CT, the circuit starts to read the packet (data) from the FIFO 111.

On the other hand, when the circuit decides at step S12 that the time stamp data TS is larger than the current time CT (TS>CT), a simple comparison is possible, but first the circuit decides at step S16 if the time stamp data TS is valid or not.

Specifically, since the time stamp data TS is constituted by the current time CT plus the maximum 63, the time TS shown by the time stamp minus the current time CT should be smaller than 64. This decision is made at step S16.

When a positive decision is obtained, the circuit proceeds to step S18. Since the current time CT has already passed the time stamp TS, the circuit immediately reads the packet from the FIFO 110 and outputs the same.

When a positive decision is obtained at step S16, since the time stamp TS is valid, the circuit waits for the time stamp TS. Here, since the time stamp TS is valid, the second figure will never not match the current time CT "25", but the circuit decides at step S17 if they do not match. If they happen not to match, the circuit forcibly reads the packet from the FIFO 110 and outputs the same.

As explained above, according to the fourth embodiment, the pre-reception processing circuit 109B outputs a stored information signal S108, which indicates that the received data has been written in the FIFO 110, to a post-reception processing circuit 109B each time a packet is written and the post-reception processing circuit 109B compares the time stamp data TS added to the received data and the cycle time CT from the inner cycle counter and, when the cycle time CT is larger than the time stamp data TS (CT>TS), outputs the received data stored in the FIFO 110, so it is possible to accurately output the isochronous communication use packet transmitted over the IEEE 1394 serial bus BS to the MPEG transporter 40 (application) side at the standard time.

Fifth Embodiment

Figure 8:
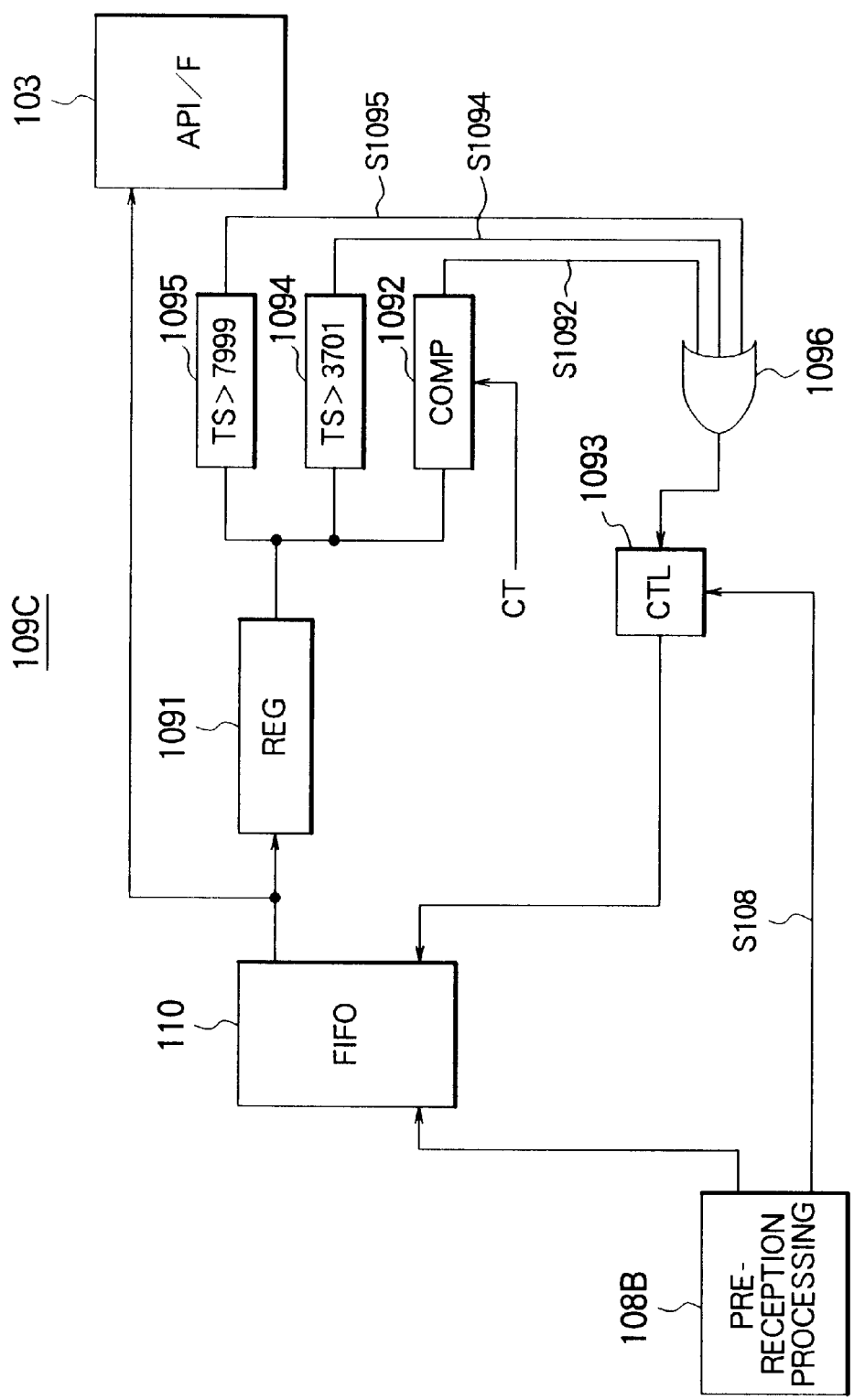
FIG. 8 is a block diagram of the configuration of a fifth embodiment of an MPEG use signal processing circuit according to the present invention applied to the IEEE 1394 serial interface.
Figure 11A:
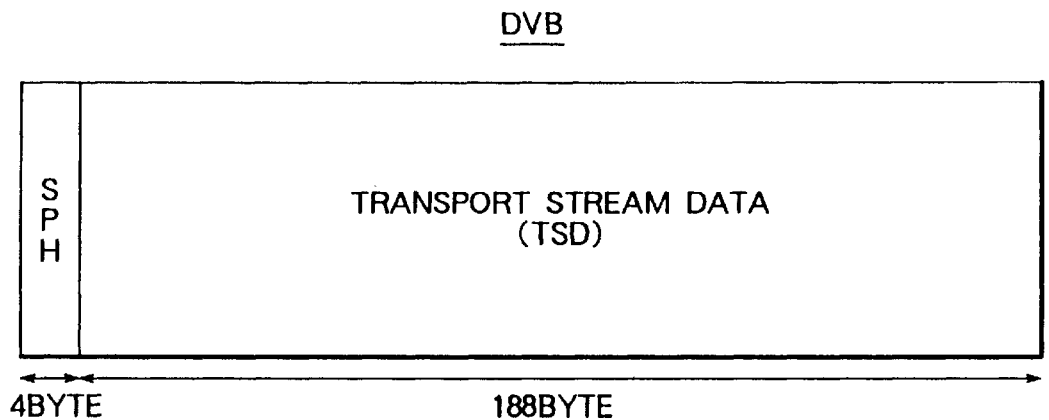
Figure 11B:
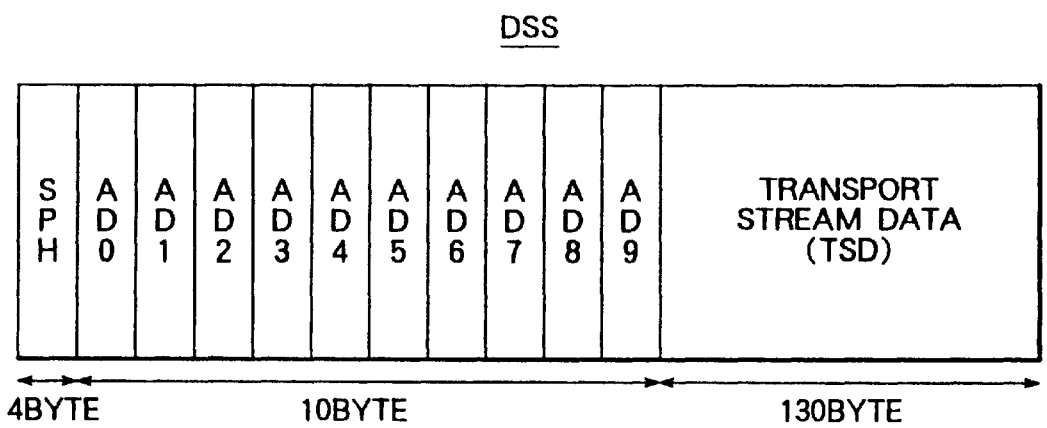
Figure 13:
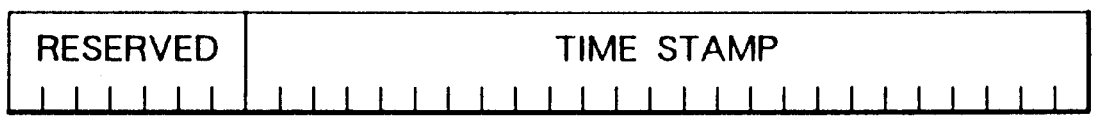
FIG. 13 is a view of the format of a source packet header.

FIG. 8 is a block diagram of the configuration of a fifth embodiment of an MPEG use signal processing circuit according to the present invention applied to an IEEE 1394 serial interface.

In the fifth embodiment, the signal processing circuit is configured in the same way as the above-mentioned fourth embodiment to compare the time stamp data TS added to the received packet and the cycle time CT from the inner cycle counter and, when the cycle time CT is larger than the time stamp data TS, output the received data stored in the FIFO 110 to the application side and is further configured in the same way as the above-mentioned second embodiment to forcibly output the received data stored in the FIFO 110 to the application side when there is an impossible value of the time stamp.

As mentioned above, the lower significant 12 bits of the time stamp never indicate more than 3072, while the upper significant 13 bits never indicate more than 8000.

However, the case where an unforeseeable setting is made due to blurring of the data or connection of different systems and the lower significant 12 bits of the time stamp show more than 3072 or the upper significant 13 bits indicate more than 8000 is assumed.

Figure 6:
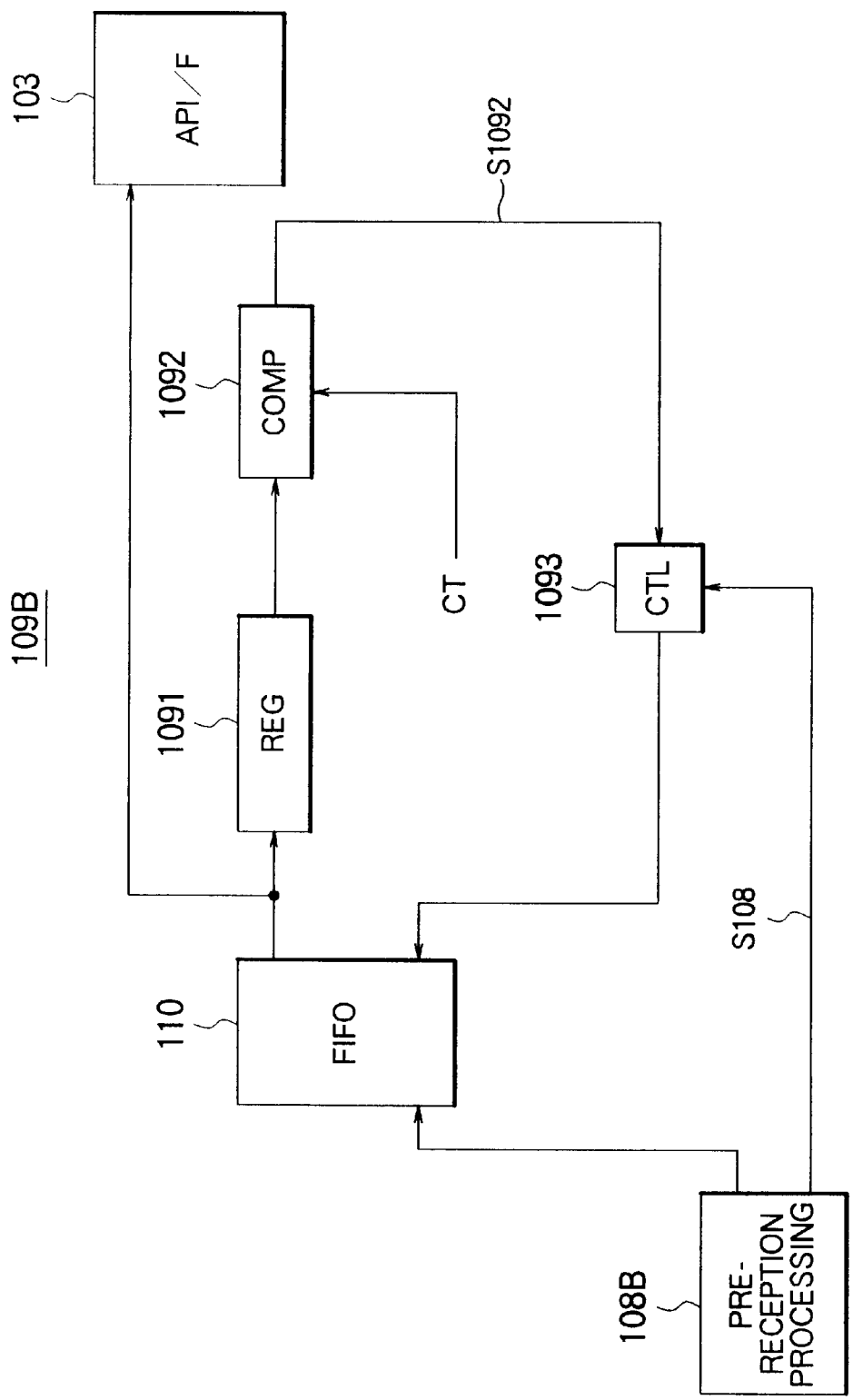
FIG. 6 is a block diagram of an example of the configuration of a time stamp processing circuit of an isochronous communication system reception processing circuit according to the fourth embodiment.

In this case, since the operation of the system may end up stopping, the post-reception processing circuit 109C, as shown in FIG. 8, is configured to provide the comparison circuit 1092 shown in FIG. 6 in parallel a decision circuit 1094 for deciding if the lower significant 12 bits of the time stamp read to the inner register 1091 exceed 3071 or not and, when they exceed them, outputting the data read instruction use pulse signal S1094, a decision circuit 1095 for deciding if the upper significant 13 bits of the time stamp exceed 7999 or not and, when they exceed them, outputting a data read instruction use pulse signal S1095, and an OR gate 1096 taking a logical sum of the output signals of the comparison circuit 1092 and the decision circuits 1094 and 1095 and to input the output of the OR gate 1096 to the data read control circuit 1093.

Accordingly, in the fifth embodiment, outputting the received data stored in the FIFO 110 to the application side when the cycle time CT is larger than the time stamp data TS is of course the usual operation, but when the lower significant 12 bits indicate more than 3072 or the upper significant 13 bits indicate more than 8000, the received data stored in the FIFO 110 is immediately output to the application side.

According to the fifth embodiment, in the same way as the fourth embodiment, the effect is of course obtained that it is possible to output a packet in the time prescribed for the application side of course. Further, a stable operation can be realized without the system stopping even if there is an impossible value of the time stamp.

Sixth Embodiment

Next, an explanation will be made of a sixth embodiment of an MPEG use signal processing circuit according to the present invention applied to an IEEE 1394 serial interface.

In the sixth embodiment, the signal processing circuit is configured in the same way as the above-mentioned fourth embodiment so as compare the time stamp data TS added to the received data and the cycle time CT from the inner cycle counter and, when the cycle time CT is larger than the time stamp data TS, output the received data stored in the FIFO 110 to the application side and further configured so as to set a time stamp disable flag to the CFR 111 from the CPU 30 and immediately output the received data stored in the FIFO 110 to the application side regardless of the value of the time stamp.

In the sixth embodiment, when a time stamp disable flag TSDF is set to the CFR 111, the data read control circuit 1093, when receiving the stored information signal S108, which indicates that the received data is stored in the FIFO 111, from the pre-reception processing circuit 108B, immediately outputs the received data stored in the FIFO 110 to the application side.

According to the sixth embodiment, since it is possible to immediately output the received data stored in the FIFO 110 regardless of the time stamp added to the received data due to the setting from the CPU 30, there is the advantage that it is possible to realize a rapid output of the data and reduce the capacity of the FIFO 110.

Seventh Embodiment

FIG. 9 is a block diagram of the configuration of the seventh embodiment of an MPEG use signal processing circuit according to the present invention applied to an IEEE 1394 serial interface.

The points of difference of the seventh embodiment from the fourth embodiment are that the pre-transmission processing circuit 106A latches the time stamp use delay time Txdelay set by the CPU 30, compares the latched delay time TxdelayL and a delay time TxdelayN newly set by the CPU 30, and, when the delay time TxdelayN becomes smaller than the latched delay time TxdelayL, outputs the data read control signal S106 to the post-transmission processing circuit 107B and that the post-transmission processing circuit 107B, when receiving the data read control signal S106 in an active state, makes the read pointer coincide with the write-pointer indicated by the stored information signal S106, reads the new transmission packet which has been increased in amount of data, from the FIFO 110, resets the data given the time stamp based on the delay time set before the amount of data was increased, adds the 1394 header and CIP headers 1 and 2 to the read packet, and outputs the packet thereof to the transmission circuit of the link core 111.

Below, an explanation will be made of the specific functions of the pre-transmission processing circuit 106A and the post-transmission processing circuit 107B which differ in function from the fourth embodiment.

The pre-transmission processing circuit 106A is provided with a latch circuit 1061, an FIFO access control circuit 1062, and a comparison circuit 1063 as shown in for example FIG. 10.

The latch circuit 1061 latches the time stamp use delay time Txdelay set to the CFR 111.

The FIFO access control circuit 1062 receives the MPEG transport stream data from the MPEG transporter 40 via the application interface circuit 103, adjusts the data length in quadlet units (4 bytes) for isochronous communication of the IEEE 1394 standard, sets the value of the time stamp using the delay time Txdelay latched in the latch circuit 1061, adds the source packet header of 4 bytes, stores the result in the FIFO 111, and outputs a stored information signal S106 of a so-called write-position of the FIFO to the post-transmission processing circuit 107B.

The comparison circuit (COMP) 1063 compares the delay time TxdelayL latched in the latch circuit 1061 and the delay time TxdelayN set to the CFR 111 and, when the delay time TxdelayN set to the CFR 111 becomes smaller than the delay time TxdelayL latched in the latch circuit 1061, concludes that for example the channel has changed, the amount of data has increased, and a shorter delay time is changed to, and outputs a data read control signal S1063 to the post-transmission processing circuit 107B.

The post-transmission processing circuit 107B receives the stored Information signal S106 from the FIFO access control circuit 1062 of the pre-transmission processing circuit 106A, adds the 1394 header and CIP headers 1 and 2 to the data containing the source packet header stored in the FIFO 110 as shown in FIG. 14, and outputs the result to transmission circuit of the link core 101.

At this time, when the data read control signal S1063 is received in the active state from the comparison circuit 1063 of the pre-transmission processing circuit 106A, it is decided that the amount of data increased and the delay time became shorter, the read pointer is made to coincide with the write pointer indicated by the stored information signal S106, the new transmission packet increased in the amount of data from the FIFO 110 is read, the 1394 header and CIP headers 1 and 2 are added, and the result is output to the transmission circuit of the link core. In this case, the data given the time stamp based on the delay time set before the amount of data increased is reset.

Next, an explanation will be made of the operation for transmission and reception of the isochronous communication use packet transmitted over the IEEE 1394 serial bus BS.

When transmitting an isochronous communication use packet to the IEEE 1394 serial bus BS, for example the time stamp use delay time Txdelay set to the source packet header (SPH) of the isochronous communication use packet is set to the CFR 111 from the CPU 30 via the host interface circuit 102.

The time stamp use delay time Txdelay set to the CFR 111 is latched in the latch circuit of the pre-transmission processing circuit 106A and input to the comparison circuit 1062 as the delay time TxdelayN.

Then, in the pre-transmission processing circuit 106A, the FIFO access control circuit 1062 receives the MPEG transport stream data by the MPEG transporter 40 via the application interface circuit 103 and adjusts the data length in quadlet units (4 bytes) for isochronous communication of the IEEE 1394 standard. At this time, the value of the time stamp is set using the delay time Txdelay latched in the latch circuit 1061, the source packet header of 4 bytes is added, and the result is stored in the FIFO 110. Then the stored information signal S106 of the write-pointer etc. of the FIFO is output to the post-transmission processing circuit 107B.

Further, the comparison circuit 1063 of the pre-transmission processing circuit 106A compares the delay time TxdelayL latched in the latch circuit 1061 and the delay time TxdelayN set to the CFR 111. When the result of the comparison is that the delay time TxdelayN set to the CFR 111 becomes smaller than the delay time TxdelayL latched in the latch circuit 1061, it concludes for example that the channel has been changed, the amount of data has been increased, and a shorter delay time is changed to, and outputs a data read control signal S1063, for example, a pulse signal, to the post-transmission processing circuit 107B.

The post-transmission processing circuit 107B receives the stored information signal S106 from the FIFO access control circuit 1062 of the pre-transmission processing circuit 106A, adds the 1394 header and CIP headers 1 and 2 to the data containing the source packet header stored in the FIFO 110, outputs the result to the transmission circuit of the link core 101, and transmits the result to the IEEE 1394 serial bus BS via the physical layer circuit 20 as an isochronous communication use packet.

At this time, when a data read control signal S1063 is received in the active state from the comparison circuit 1063 of the pre-transmission processing circuit 106A, it is decided that the amount of data has increased and the delay time has been changed to a shorter one. Further, the read-pointer is made to coincide with the write pointer Indicated by the stored information signal S106, a new transmission packet increased in the amount of data is read from the FIFO 110, the 1394 header and CIP headers 1 and 2 are added, and the result is output to the transmission circuit of the link core 111 and transmitted to the IEEE 1394 serial bus BUS via the physical layer circuit 20 as an isochronous communication use packet.

In this case, the data given the time stamp based on the delay time set before the amount of data increased is reset.

The isochronous communication use packet transmitted over the IEEE 1394 serial bus BS is input to the pre-reception processing circuit 108B via the link core 101.

The pre-reception processing circuit 108B analyzes the contents of the 1394 header, CIP headers 1 and 2, etc. of the received packet, restores the data, and stores the source packet head and data in the FIFO 110. Then, the stored information signal S108, which indicates that the data has been stored in the FIFO 110, is output to the post-reception processing circuit 109B whenever a packet is written.

The post-reception processing circuit 109B, whenever receiving the signal S108, reads the time data of the time stamp of the source packet header stored in the FIFO 110 to the inner register 1091. Then, the read time stamp data TS and the cycle time CT from the cycle timer in the link core 101 are compared.

When the result is that the cycle time CT is larger than the time stamp data TS, the data read indication use pulse signal S1092 is output to the data read control circuit 1093.

The data read control circuit 1093, when receiving the pulse signal S1092, outputs the data read signal S1093 and outputs the data minus the source packet header stored in the FIFO 110 to the MPEG transporter 40 via the application interface circuit 103 as the MPEG use transport stream data.

Note that the comparison operation of the post-reception processing circuit is performed in the same way as the fourth embodiment explained with reference to FIG. 7. Accordingly, a detailed explanation will be omitted here.

As explained above, according to the seventh embodiment, since the pre-transmission processing circuit 106A latches the time stamp use delay time Txdelay set by the CPU 30, compares the latched delay time TxdelayL and a delay time TxdelayN newly set by the CPU 30 in accordance with the amount of data, and, when the delay time TxdelayN becomes smaller than the delay time TxdelayL latched in the latch circuit 1061, concludes that for example the channel has been changed, the amount of data has increased, and a shorter delay time has been changed to, and outputs a data read control signal S106 to the post-transmission processing circuit 107B and since the post-transmission processing circuit 107B, when receiving the data read control signal S106 in the active state, decides that the amount of data has been increased and a shorter delay time is changed to, makes the read pointer coincide with the write-pointer indicated by the stored information signal S106, reads the new transmission packet increased in the amount of data from the FIFO 110, resets the data given the time stamp based on the delay time set before the amount of data increased, adds the 1394 header and CIP headers 1 and 2 to the read packet, and outputs the result to the transmission circuit of the link core 111, there is the advantage that it is possible to prevent data loss or the output of unnecessary data to the application side at the reception side even if the time information set according to the amount of data is changed.

Further, since this embodiment compares the time stamp data TS given to a received packet and the cycle time CT from the inner cycle counter and, when the cycle time CT is larger than the time stamp data TS (CT>TS), outputs the received data stored in the FIFO 110, it is possible to accurately output the isochronous communication use packet transmitted over the IEEE 1394 serial bus BS to the MPEG transporter 40 (application) side in a standard time.

As explained above, according to the present invention, it is possible to set the error bit simply without increasing the size of circuit even if the size of the source packet header is changed.

Further, there is the advantage that stable operation can be realized without the system stopping even if the value of the time stamp is impossible.

Further, according to the present invention, there is the advantage that it is possible to perform the late processing of the transmission automatically and realize accurate packet transmission.

According to the present invention, it is possible to output a packet to the application side in a standard time.

Further, according to the present invention, since it is possible to immediately output the received data regardless of the time information added to the received data, so it is possible to realize rapid output of data.

Further, there is the advantage that it is possible to reduce the capacity of the memory means for storing the received data.

Further, according to the present invention, there is the advantage that it is possible to prevent data loss or output of unnecessary data to the application side.

While the invention has been described with reference to specific embodiments chosen for purposes of illustration, it should be apparent that numerous modifications could be made thereto by those skilled in the art without departing from the basic concept and scope of the invention.

What is claimed is:

1. A signal processing circuit for adding information to packet data, said information pertaining to a time for a reception side to output received data to an application side, and transmitting the result over a serial interface bus in a predetermined time cycle, comprising:

a control means to set a delay time to be added according to an amount of transmission data, a memory means, a first transmission circuit for adding the time information to the transmission data based on the delay time set by the control means, storing the result in the memory means, and outputting a stored information signal, a comparison circuit for comparing a previously set delay time from the control means and a newly set delay time and outputting a data read control signal when the newly set delay time is shorter, and a second transmission circuit for receiving the stored information signal of the first transmission circuit, reading packet data containing time information stored in the memory means, outputting the read packet data as transmission data, and, when receiving the data read control signal, reading packet data to which time information was added based on the newly set delay time and outputting it as transmission data.

2. A signal processing circuit according to claim 1, further comprising a latch circuit for latching the delay time set by the control means, the first transmission circuit adds the time information based on the delay time latched by the latch circuit, and the comparison circuit compares the delay time set by the control means and the delay time latched by the latch circuit.

3. A signal processing circuit according to claim 1, further comprising:

a counting means for counting time; and a reception circuit for fetching the time information from packet data transmitted over the serial interface bus and outputting the received data to the application side when the value of the time counted by the counting means is larger than the value of the time information.

4. A signal processing circuit according to claim 3, wherein the reception circuit comprises:

a memory means, a pre-processing circuit for restoring data from the packet data transmitted over the serial interface bus, storing the result in the memory means with the time information, and outputting a stored information signal, a comparison circuit for receiving the stored information signal of the pre-processing circuit, reading the time information stored in the memory means, comparing the time information and the value of the time counted by the counting means, and outputting a data read instruction signal when the count is larger, and a data read control means for reading the data stored in the memory means and outputting the data to application side when receiving the data read instruction signal.

* * * * *